(12) United States Patent
Hagerty et al.

(10) Patent No.: US 7,300,987 B2
(45) Date of Patent: Nov. 27, 2007

(54) POLYMERIZATION PROCESS

(75) Inventors: Robert O. Hagerty, La Porte, TX (US); Kevin B. Stavens, Seabrook, TX (US); Marc L. DeChellis, Houston, TX (US); D. Brett Fischbuch, Kingwood, TX (US); James M. Farley, League City, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/515,525

(22) Filed: Sep. 5, 2006

(65) Prior Publication Data

US 2007/0004878 A1    Jan. 4, 2007

Related U.S. Application Data

(63) Continuation of application No. 11/132,863, filed on May 19, 2005, now Pat. No. 7,122,607.

(60) Provisional application No. 60/572,876, filed on May 20, 2004, provisional application No. 60/572,786, filed on May 20, 2004, provisional application No. 60/581,463, filed on Jun. 21, 2004.

(51) Int. Cl.
  *C08F 2/34* (2006.01)
  *C08F 10/00* (2006.01)

(52) U.S. Cl. .................. 526/73; 526/68; 526/206; 526/901

(58) Field of Classification Search ............ 526/68, 526/73, 206, 901
  See application file for complete search history.

(56) References Cited

U.S. PATENT DOCUMENTS

| | | | |
|---|---|---|---|
| 3,056,771 A | 10/1962 | Aldridge et al. | 260/94.9 |
| 3,082,198 A | 3/1963 | Klein | 260/94.9 |
| 3,470,143 A | 9/1969 | Schrage et al. | 260/82.5 |
| 3,919,185 A | 11/1975 | Takebe et al. | 260/93.7 |
| 4,012,574 A | 3/1977 | Jones et al. | 526/74 |
| 4,194,073 A | 3/1980 | McDaniel | 526/98 |
| 4,232,140 A | 11/1980 | Ort | 526/129 |
| 4,588,790 A | 5/1986 | Jenkins et al. | 526/70 |
| 4,593,010 A | 6/1986 | Malpass | 502/115 |
| 4,792,592 A | 12/1988 | Fulks et al. | 526/62 |
| 4,803,251 A | 2/1989 | Goode et al. | 526/59 |
| 4,855,370 A | 8/1989 | Chirillo et al. | 526/74 |
| 5,026,795 A | 6/1991 | Hogan | 526/74 |
| 5,037,905 A | 8/1991 | Cummings et al. | 526/74 |
| 5,066,736 A | 11/1991 | Dumain et al. | 526/82 |
| 5,194,526 A | 3/1993 | Hussein et al. | 526/74 |
| 5,342,907 A | 8/1994 | Cann et al. | 526/129 |
| 5,352,749 A | 10/1994 | DeChellis et al. | 526/68 |
| 5,391,657 A | 2/1995 | Song et al. | 526/74 |
| 5,405,922 A | 4/1995 | DeChellis et al. | 526/68 |
| 5,410,002 A | 4/1995 | Govoni et al. | 526/88 |
| 5,436,304 A | 7/1995 | Griffin et al. | 526/68 |
| 5,453,471 A | 9/1995 | Bernier et al. | 526/68 |
| 5,462,999 A | 10/1995 | Griffin et al. | 526/68 |
| 5,510,433 A | 4/1996 | Baker et al. | 526/74 |
| 5,616,661 A | 4/1997 | Eisinger et al. | 526/88 |
| 5,624,878 A | 4/1997 | Devore et al. | 502/152 |
| 5,990,251 A | 11/1999 | Gelus | 526/125.7 |
| 6,313,236 B1 | 11/2001 | Ford et al. | 526/74 |
| 6,417,298 B1 | 7/2002 | Ford et al. | 526/89 |
| 6,455,638 B2 | 9/2002 | Laughner et al. | 525/191 |
| 6,534,613 B2 | 3/2003 | Ford et al. | 526/352 |
| 7,122,607 B2 * | 10/2006 | Hagerty et al. | 526/73 |
| 2001/0044505 A1 | 11/2001 | Ford et al. | 526/62 |
| 2003/0100688 A1 | 5/2003 | Farrer et al. | 526/110 |
| 2003/0171512 A1 | 9/2003 | Mawson et al. | 526/129 |

FOREIGN PATENT DOCUMENTS

| | | |
|---|---|---|
| EP | 0 089 691 | 9/1983 |
| EP | 0 453 116 | 10/1991 |
| EP | 0 549 252 | 6/1993 |
| EP | 0 722 955 | 7/1996 |
| EP | 0 754 708 | 1/1997 |
| EP | 0 794 200 | 9/1997 |
| EP | 1 323 746 | 7/2003 |
| WO | 97/14721 | 4/1997 |
| WO | 03/010211 | 2/2003 |
| WO | 2004/058825 | 7/2004 |
| WO | 2004/058827 | 7/2004 |
| WO | 2004/058828 | 7/2004 |

* cited by examiner

*Primary Examiner*—Fred Teskin
(74) *Attorney, Agent, or Firm*—Leandro Arechederra; Catherine L. Bell

(57) ABSTRACT

The present invention relates to a continuous gas phase process comprising polymerizing one or more hydrocarbon monomer(s) in a fluidized bed reactor in the presence of catalyst system or polymerization catalyst and a condensable fluid for a period of at least 12 hours where the bed temperature is less than the Critical Temperature and the dew point temperature of the gas composition in the reactor is within 25° C. of the bed temperature.

57 Claims, 1 Drawing Sheet

POLYMERIZATION PROCESS

CROSS REFERENCE TO RELATED APPLICATIONS

This application is a continuation of Ser. No. 11/132,863, filed May 19, 2005, now U.S. Pat. No. 7,122,607, which claims the benefit of Ser. No. 60/572,876, filed May 20, 2004, Ser. No. 60/572,786, filed May 20, 2004, and Ser. No. 60/581,463, filed Jun. 21, 2004, the disclosures of which are incorporated by reference in their entireties.

FIELD OF THE INVENTION

The present invention relates to a gas phase polymerization process operating below the Critical Temperature.

BACKGROUND OF THE INVENTION

Advances in polymerization and catalysis have resulted in the capability to produce many new polymers having improved physical and chemical properties useful in a wide variety of superior products and applications. With the development of new catalysts, the choice of polymerization-type (solution, slurry, high pressure or gas phase) for producing a particular polymer has been greatly expanded. Also, advances in polymerization technology have provided more efficient, highly productive and economically enhanced processes. Regardless of these technological advances in the polyolefin industry, common problems, as well as new challenges still exist. For example, the tendency for a gas phase process to foul and/or sheet remains a challenge, which can particularly be dependent on the polymer being produced and the catalyst system employed.

Fouling, sheeting and/or static generation in a continuous gas phase process, in for example heat exchangers, distributor plates, and probes, can lead to the ineffective operation of various reactor systems. In a typical continuous gas phase process, a recycle system is employed for many reasons including the removal of heat generated in the process by the polymerization reaction, and recycle processes offer many opportunities for fouling.

Evidence of, and solutions to, various process operability problems, including fouling, sheeting, chunking, agglomerating and static build up, have been addressed by many in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,066,736 and EP-A1 0 549 252 discuss the introduction of an activity retarder to the reactor to reduce agglomerates; EP-A1 0 453 116 discusses the introduction of antistatic agents to the reactor for reducing the amount of sheets and agglomerates; U.S. Pat. No. 4,012,574 discusses the addition of a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. No. 3,470,143 describes a reduction in fouling in mostly slurry processes for producing primarily elastomers using a fluorinated organic carbon compound.

Likewise, further evidence of, and solutions to, various process operability problems have been addressed by many in the art. For example, U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; U.S. Pat. No. 3,919,185 describes a slurry process using a nonpolar hydrocarbon diluent with a conventional Ziegler-Natta-type or Phillips-type catalyst and a polyvalent metal salt of an organic acid having a molecular weight of at least 300; U.S. Pat. No. 5,990,251 relates to increasing catalyst activity of a Ziegler-Natta-type catalyst by using very small quantities of a halogenated hydrocarbon, specifically a molar ratio between 0.001 and 0.15 of the halogenated hydrocarbon, particularly chloroform, to the metal of the catalyst, specifically titanium; U.S. Pat. No. 6,455,638 is directed to a polymer blend having components with different ethylene content, and U.S. Pat. No. 5,624,878 relates primarily to the use in polymerization of catalytic derivatives of titanium (II) and zirconium (II) metallocene-type complexes; both U.S. Pat. Nos. 6,455,638 and 5,624,878 mention generally, in passing, using in polymerization various solvents such as straight-chain hydrocarbons, cyclic and alicyclic hydrocarbons, perfluorinated hydrocarbons, aromatic and alkyl-substituted aromatic compounds, and mixtures thereof. U.S. Pat. No. 6,534,613 describes using a Ziegler-Natta-type catalyst in combination with a halogenated hydrocarbon, particularly chloroform, and an electron donor to produce polymers useful for making better quality films. EP 1 323 746 shows loading of biscyclopentadienyl catalyst onto a silica support in perfluorooctane and thereafter the prepolymerization of ethylene at room temperature. U.S. Pat. No. 3,056,771 discloses polymerization of ethylene using $TiCl_4/(Et)_3Al$ in a mixture of heptane and perfluoromethylcyclohexane, presumably at room temperature.

ExxonMobil patents U.S. Pat. Nos. 5,352,749, 5,405,922, and 5,436,304 disclose the use of high induced condensing agent (ICA) concentrations for high condensing levels, and high (heat transfer limited) production rates in gas phase reactors. These patents teach various means to determine the limiting concentration of ICA (such as isopentane) that can be tolerated in the gas phase reactors without inducing stickiness. These patents do not note the discovery of a critical temperature, below which stickiness induced by high condensable concentrations cannot occur.

Others have addresses stickiness prevention in gas phase reactors including U.S. Pat. Nos. 5,510,433, 5,342,907, 5,194,526 and 5,037,905 These patents disclose that very low density, sticky materials can be produced in gas phase reactors by adding 10-20 wt % of inert, "refractory" material to the fluid bed. Suitable refractory materials are micro-fine silica and carbon black. However, application of the technology is expensive and requires substantial investment in powder handling equipment in the production plant.

Furthermore, it is well known that stable operation of fluidized bed reactors used in the production of polymers requires the avoidance of conditions that lead to sticky polymer. Sticky or cohesive polymer causes a range of problems in the gas phase reactor systems. For example, sticky polymer can reduce the quality of fluidization that occurs within the reactor, and can reduce the degree of internal mixing below the minimum levels required to disperse the catalyst and maintain stable temperature control. In addition, stickiness of the polymer can lead to the deposition of polymer product on the walls of the reactor expanded section, which often leads to the formation of dome sheets (solid masses of polymer material deposited on the walls of the "dome", or expanded section of the reactor) In many cases, these dome sheets are large and massive, containing as much as 100 kg of agglomerated polymer. These dome sheets eventually fall from the dome and become lodged on the distributor plate, where they interfere with fluidization. In some cases, the dome sheets block the product discharge port, and force a reactor shut-down for cleaning. For these reasons it is desirable to have means of preventing excessive stickiness of the polymer product.

Polymer stickiness is thought to be a function of several process and product variables within the reactor. The relevant process variables include the reaction temperature and the concentrations (or partial pressures) of condensable components such as 1-hexene and isopentane in the reactor gas phase. In general, stickiness of the polymer is promoted by higher reaction temperature and higher condensable concentrations. Important product properties include the resin density, molecular weight (or melt index), and the molecular weight distribution (MWD). In general, stickiness of the polymer is promoted by lower resin density, lower molecular weight (higher melt index), and broader molecular weight distribution (Mw/Mn=MWD).

Fluid bed reactors used to produce polyethylene resin are normally operated with a relatively high reaction temperature. For example, in the production of a typical low density film resin (0.917 g/cc density, 1 dg/min melt index) produced with metallocene or Ziegler-Natta catalyst, the reaction temperature is typically operated at 85° C. A relatively high reactor temperature provides for a relatively high temperature differential over the cooling water temperature (which typically operates at 30 to 35° C.). This, in conventional practice, is thought to provide for maximum heat removal capability for maximum production rates.

It would be desirable to have a polymer production process that is free of polymer agglomeration or stickiness. It would also be desirable to have a process that allows higher concentrations of condensables and/or higher dew point temperatures in the reactors for higher production rates.

Our findings indicate that, in many cases, the operating temperatures are too high relative to the polymer sticking temperature. Although it appears counterintuitive, we found that it is possible to reduce operating temperatures and actually increase maximum production rates, while avoiding problems of resin stickiness.

SUMMARY OF THE INVENTION

The invention is directed to a continuous process for polymerizing one or more hydrocarbon monomer(s), preferably a gas phase process, preferably operating in condensed mode, preferably operating with a fluidized bed, for polymerizing one or more olefin(s) in the presence of catalyst system or polymerization catalyst and a condensable fluid, preferably a condensable fluid comprising a C3 to C10 hydrocarbon, a fluorinated hydrocarbon or a combination thereof at a temperature less than the Critical Temperature for a period of at least 12 hours preferably 24 hours.

This invention further relates to a continuous process, preferably a gas phase process, preferably operating in condensed mode, preferably operating with a fluidized bed, to polymerize one or more hydrocarbon monomers (such as linear or branched alpha-olefins) comprising operating the process in an insulted gas phase reactor at a temperature less than the Critical Temperature.

This invention further relates to a continuous process, preferably a gas phase process, preferably operating in condensed mode, preferably operating with a fluidized bed, to polymerize one or more hydrocarbon monomers (such as olefins) comprising operating the process in a gas phase reactor at a bed temperature less than the Critical Temperature and where the dew point of the gas in the reactor is within 20° C. of the bed temperature.

This invention further relates to a continuous process, preferably a gas phase process, preferably operating in condensed mode, preferably operating with a fluidized bed, to polymerize hydrocarbon monomer(s) in a reactor, said process comprising the steps of:
  (a) introducing a recycle stream into the reactor, the recycle stream comprising one or more monomer(s);
  (b) introducing a polymerization catalyst and a condensable fluid into the reactor where the reactor temperature is less than the Critical Temperature for a period of more than 24 hours;
  (c) withdrawing the recycle stream from the reactor;
  (d) cooling the recycle stream to form a gas phase and a liquid phase;
  (e) reintroducing the gas phase and the liquid phase, separately, and/or in combination, into the reactor;
  (f) introducing into the reactor additional monomer(s) to replace the monomer(s) polymerized; and
  (g) withdrawing a polymer from the reactor, preferably at a rate of at least 50,000 lb/hour (22,700 kg/hr).

Alternately, in any embodiment herein the gas phase polymerization is operated in a condensed mode in which a liquid and a gas are introduced to a fluidized bed reactor having a fluidizing medium, wherein the level of condensable fluid is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor.

In any of the above processes of the invention, a preferred catalyst system or polymerization catalyst is a conventional-type transition metal catalyst such as a Ziegler-Natta-type catalyst or a Phillips-type catalyst, or a bulky ligand metallocene-type catalyst.

DETAILED DESCRIPTION OF THE INVENTION

Figure 1:
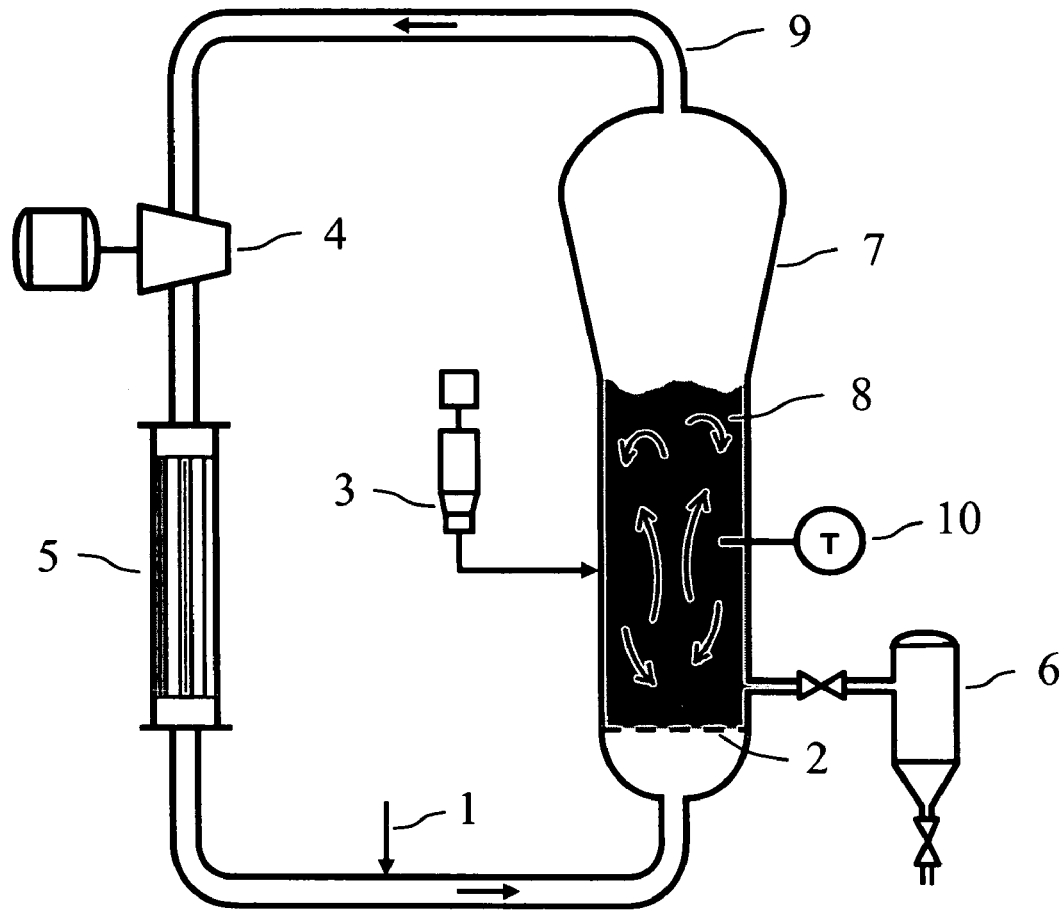
FIG. 1 is a drawing of a typical gas phase process employing a recycle stream, where catalyst (3) and monomer feed (1) enter the gas phase reactor (7) and are swept above the distributor plate (2) into the fluidized bed mixing zone (8), provided with at least one temperature monitoring probe (10) where the monomer is polymerized into polymer that is then withdrawn via a discharge apparatus (6), at the same time a recycle stream (9) is withdrawn from the reactor (7) and passed to a compressor (4), from the compressor the recycle stream is passed to a heat exchanger (5), and thereafter the recycle stream is passed back into the reactor along with the monomer feed (1).

The invention is generally directed toward a polymerization process, particularly a gas phase process for polymerizing one or more monomer(s) in the presence of a catalyst system. The invention also relates to a polymerization process having improved operability and product capabilities. It has been surprisingly discovered that operating at a specific set of conditions below the usual commercial conditions in a gas phase polymerization process (e.g. below the Critical Temperature) provides for a substantially improved polymerization process and the production of polymers at commercially acceptable production rates.

We have found that problems associated with polymer stickiness induced by condensables in the reactor can be significantly reduced or even eliminated by a process involving: 1) determining the dry sticking temperature of the polymer to be produced, 2) determining the melting point depression of the polymer that occurs when a sample of the polymer to be produced is immersed in a liquid (or liquid mixture) of the condensables to be used in the process (ICA and comonomer), 3) operating the gas phase reactor process with a bed temperature below a Critical Temperature, defined as the dry sticking temperature minus melting point depression. With the bed temperature below the Critical Temperature, stickiness in the resin due to high condensables concentrations is reduced or eliminated altogether. Hence, the condensable concentrations in the reactor can then be raised to obtain higher dew point temperatures, higher condensing levels, and higher production rates.

With the process of the present invention, the condensable concentration in the reactor is not significantly limited by stickiness, so the dew point temperature can be raised to the allowable dew point limit, which we define as $T_{DP}$ (max). In general, the maximum allowable dew point temperature will be a function of the bed temperature as well as the temperature of the reactor walls. (The walls of the reactor normally operate somewhat lower than the bed temperature.) The highest allowable dew point temperatures are obtained with wall temperatures equal to the bed temperature, which is operated at or slightly below the critical temperature. For this reason, the use of reactors with external insulation is preferred in some embodiments. The external insulation may be used in combination with heating means (electrical or steam tracing with an associated temperature control system) to maintain the reactor wall temperatures approximately equal to the bed temperature (e.g. within 2° C. of the bed temperature or less, preferably 1° C. or less).

To better understand the instant invention, it is useful to discuss stickiness in gas phase reactors. Stickiness can be induced in polymers by two means: (1) raising the temperature of the material, or (2) by increasing the concentration of dissolved components within the polymer. In the gas phase process, the dissolved components include the higher molecular weight (higher boiling) components in the reactor gas such as, comonomers (e.g. 1-butene or 1-hexene) and induced condensing agents (ICA's). ICA's are inert condensable fluids (typically C5 or C6 saturated hydrocarbons) that are added to the reactor to increase the cooling capacity of the reactor system for increased production rates. Use of ICA's is further described in U.S. Pat. Nos. 5,342,749 and 5,436,304 both of which are herein fully incorporated by reference. Lower molecular weight components such as ethylene, nitrogen and hydrogen typically have only minimal solubility in the polymer, and therefore do not tend to induce stickiness in the polymer.

Figure 2:
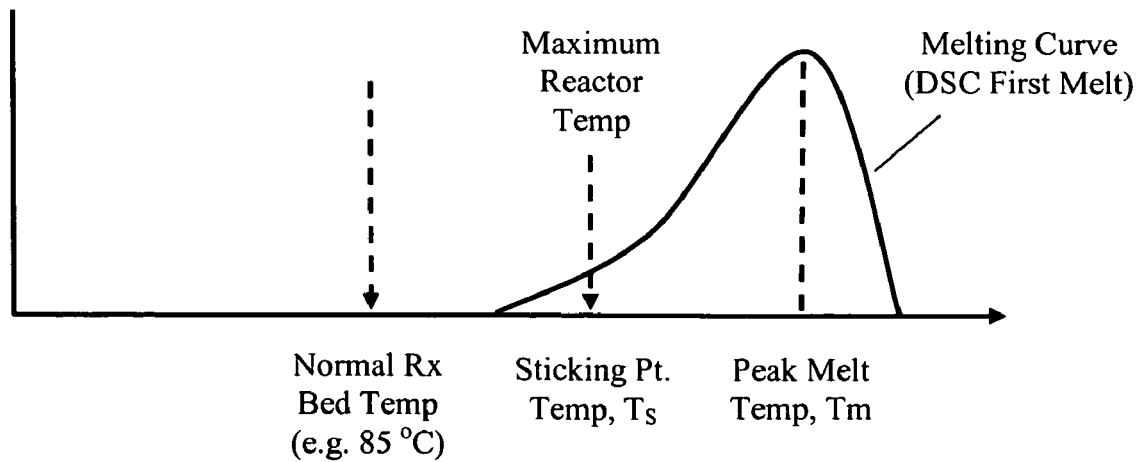
FIG. 2 shows an approximation of a typical DSC melting curve of a polymer illustrating a typical reactor temperature and the limiting resin sticking temperature (Ts) relative to the DSC melting curve.

FIG. 2 shows an approximation of a typical DSC melting curve of a polymer. The melting temperature $^{TM}$ is taken as the peak of the melting curve. The reactor bed temperature is normally operated considerably below the melting temperature as shown. For a typical LLDPE film resin (0.917 g/cc density, melt index of 1 dg/min) the melting temperature of the polymer is in the range of 119 to 127° C. (as measured dry, without dissolved components). For these grades the bed temperature would normally be set at 84 to 87° C. Stickiness in the polymer would be induced if the reactor bed temperature were increased to the point at which it would begin to overlap the polymer melting curve as shown in the figure. For Ziegler-Natta catalyzed resins, stickiness occurs when approximately 15% overlap occurs (i.e. 15% of the crystalline fraction of the polymer melted). For metallocene catalyzed resins, a higher degree of overlap is required to induce stickiness. While the exact number is not known for metallocene, it is believed to be in the range of 30 to 40%.

Stickiness can also be induced in the polymer product by increasing the concentration of condensables in the reactor gas phase. The condensables become dissolved in the polymer and act to depress the polymer melt curve. Stickiness in the polymer results when the melting curve is depressed to the point at which it overlaps the reactor operating temperature (the bed temperature).

Thus determination of the sticking temperature for each polymer to be made is very useful to reactor operations. The dry sticking temperature must be determined in a fluid bed of the polymer to be tested operating at substantially the same conditions as the production process, but with no condensable gases in the system and with no catalyst (i.e. no reaction). The dry sticking temperature is determined in a reactor operating at equivalent pressure and gas velocity, but with the normal gas components replaced with substantially pure nitrogen. The vessel for the testing has a differential pressure sensor for monitoring the pressure difference between the bottom and the top of the fluid bed (bed DP), and DP sensors for monitoring the degree of fouling (if any) on the reactor heat exchanger, and distributor plate. The fluid bed is initially operated at a bed temperature $T_B$ of at least 40° C. below the peak melting temperature Tm of the polymer to be produced. The bed temperature is then slowly increased at a rate of 2° C. per hour. The dry sticking temperature is taken as the temperature at which agglomerations or fouling on any surface of the vessel begins to occur (as evidenced by an increase in heat exchanger or plate DP) or the temperature at which there is at least a 50% drop in bandwidth of the bed DP reading, which ever is the lesser temperature.

Once the dry sticking temperature of the system is determined then the melting point depression of the polymer in question is determined. The melting point depression of the polymer ($\Delta$Tm) is determined by first measuring the melting temperature of a polymer by DSC, and then comparing this to a similar measurement on a sample of the same polymer that has been soaked with the condensable fluid or condensable fluid mixture for a period of four hours. In general, the melting temperature of the soaked polymer will be lower than that of the dry polymer. The difference in these measurements is taken as the melting point depression ($\Delta$Tm). Higher concentrations of dissolved materials in the polymer cause larger depressions in the polymer melting temperature (i.e. higher values of $\Delta$Tm). A suitable DSC technique for determining the melting point depression is described by, P. V. Hemmingsen, "Phase Equilibria in Polyethylene Systems", Ph.D Thesis, Norwegian University of Science and Technology, March 2000. (A preferred set of conditions for conducting the tests are summarized on Page 112 of this reference.) The polymer melting temperature is first measured with dry polymer, and then repeated with the polymer immersed in liquid (the condensable fluid or condensable fluid mixture to be evaluated) where the polymer has been immersed for four hours. As described in the reference above, it is important to ensure that the second part of the test, conducted in the presence of the liquid, is done in a sealed container so that the liquid is not flashed during the test, which could introduce experimental error. In conventional DSC work, it is common to measure the "second melt" curve. This involves steps melting the polymer in a first scan through the DSC, cooling it back to ambient temperature, and slowly reheating the material for the final DSC test. This second melt method provides improved reproducibility, but is not the preferred method for the present work. To determine the Critical Temperature for gas phase operation, it is preferred to use only a single pass (or scan) in the DSC. This "first melt" data is believed to more accurately reflect the true melt curve of the resin as it exists in the reactor.

The actual depression of the polymer melting curve that will occur in a gas phase reactor will be variable depending on the concentrations of condensable components in the system. Lower concentrations of condensables will produce smaller depressions, and higher concentrations will produce larger depressions. In all cases, the actual depression will be less than or equal to the melting point depression measured in a liquid immersed sample. For hydrocarbons, we found the maximum depression to typically about 19 to 22° C. depending on which hydrocarbons are used.

The Critical Temperature is defined as the dry sticking temperature minus the melting point depression (i.e. Tc=Ts (dry)−ΔTm).

If the reactor bed temperature is reduced so that it is equal to or less than the critical temperature, it is theoretically difficult, if not impossible, to induce stickiness in the resin by partial melting of the polymer, regardless of the concentration of condensable components in the reactor system. It is therefore possible to increase the ICA concentration to the point at which the dew point temperature of the reactor gas is equal to the bed temperature. This would produce saturation of the reactor gas with the ICA, but will not induce stickiness in the fluid bed.

However, with non-insulated reactor walls, it is not easy to operate with a dew point temperature equal to the bed temperature. The walls of the reactor (i.e. the metal reactor vessel) normally operate at temperatures somewhat cooler than the fluid bed. For example, the walls of the reactor straight section are typically 3 to 4° C. lower than the bed temperature, and the walls of the expanded section (above the fluid bed) are typically 5 to 6° C. lower than the bed temperature. In the past, to avoid condensation on the walls of the reactor and expanded section, it was typical to limit the dew point temperature (and corresponding ICA concentration) to a value approximately 10-12° C. less than the bed temperature. Now however, we can define a maximum allowable dew point temperature as $T_{DP}$ (max). It is the lowest of the following three temperatures; the reactor wall temperature (the metal temperature in the reaction section), the reactor dome temperature, or the reactor bed temperature. Thus, the highest allowable dew point limits (and consequently the highest allowable production rates) will be obtained for reactors with wall and dome temperatures approximately equal to the bed temperature. For this reason, the use of insulated reactors are extremely useful in the process of the present invention. The external insulation may be used in combination with heating means (electrical or steam tracing with an associated temperature control system) to maintain the reactor wall temperatures approximately equal to the bed temperature (e.g. within 2° C. of the bed temperature, preferably 1° C. or less). In a preferred embodiment, if the reactor were provided with effective external insulation on both the straight section and the expanded section (dome), the allowable dew point temperature could be raised to approximately the bed temperature. This would provide a substantial increase in dew point temperature and corresponding increases in maximum condensed mode production rates compared to processes of the prior art.

Suitable insulation materials include ceramic fiber, fiberglass, and calcium silicate. The thickness of the insulation would preferably be 1 to 15 cm, and more preferably 5 to 8 cm. The insulation would preferably be weather-proofed to prevent water incursion. Suitable weather-proofing material would be metal cladding panels with sealant (or caulking) applied at the panel junctions.

Suitable instruments for measuring the reactor wall and dome temperatures include conventional wall temperature probes. These "wall TC" probes are typically mounted in stainless steel sheaths (3-6 mm in diameter) with a rounded tip that contains the thermocouple sensing element. These probes are typically inserted through the reactor wall using an appropriate pressure sealing (or feedthrough) device. Suitable feedthrough devices include those manufactured by Conax Buffalo Corp. The probes are inserted through the sealing device such that the tip of each probe is approximately flush with the interior wall, or extend slightly (1-5 mm) past the wall into the reactor. Reactors are preferably equipped with a number of wall TC probes to monitor wall temperatures at various positions in the reactor section and dome.

In a preferred embodiment any of the polymerization process described herein are a continuous process. By continuous is meant a system that operates (or is intended to operate) without interruption or cessation. For example a continuous process to produce a polymer would be one in which the reactants are continuously introduced into one or more reactors and polymer product is continually withdrawn.

Alternately, the invention provides for a continuous gas phase process for polymerizing one or more hydrocarbon monomer(s) in the presence of a conventional-type transition metal catalyst or catalyst system and a condensable fluid, preferably a C3 to C10 hydrocarbon, a fluorinated hydrocarbon or a mixture thereof, wherein, the conventional-type transition metal catalyst or catalyst system comprises a transition metal, wherein the molar ratio of the condensable fluid to the transition metal is greater than 500:1, preferably the molar ratio is in the range of from 900:1 to 10,000:1, preferably 1500:1 to 20,000:1, and the reactor temperature is below the Critical Temperature, optionally for more than 24 hours.

Alternately, the invention is directed to a continuous gas phase process for polymerizing one or more hydrocarbon olefin(s), preferably at least one of which is ethylene or propylene, in the presence of a polymerization catalyst, in a fluidized bed reactor, the process operating in a condensed mode in which a liquid and a gas are introduced to the fluidized bed reactor having a fluidizing medium, wherein the level of condensable fluid, preferably a C3 to C10 hydrocarbon, a fluorinated hydrocarbon or a mixture thereof, is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor, and where the reactor temperature is below the Critical Temperature, preferably for a period of more than 24 hours.

In another embodiment, the polymerization catalyst comprises a metal, and the molar ratio of the condensable fluid, to the metal is greater than 500:1, preferably in the range of from 900:1 to 10,000:1, preferably 1500:1 to 20,000:1.

In another embodiment, the process is further operated wherein the level of condensable liquid is greater than 1 weight percent, preferably greater than 2 weight percent, more preferably greater than 10 weight percent, even more preferably greater than 15 weight percent, still even more preferably greater than 25 weight percent, and most preferably greater than 30 weight percent up to 60 weight percent or more, preferably 35 weight percent or more, based on the total weight of the liquid and gas entering the reactor. In a further preferred embodiment, the conventional-type transition metal catalyst or catalyst system comprises a transition metal, wherein the molar ratio of the condensable fluid, preferably the fluorinated hydrocarbon, to the transition metal is greater than 500:1, preferably the molar ratio is greater than 900:1, and most preferably the molar ratio is greater than 1000:1.

In an embodiment, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst or catalyst system and a condensable fluid into the reactor where the reactor operates at a temperature below the Critical Temperature, preferably for a period of more than 24 hours; (c) withdrawing the recycle stream from the reactor; (d) cooling the recycle stream to form a gas phase and a liquid phase; (e) reintroducing the gas phase and the liquid phase, separately, and/or in combination, into the reactor; (f) introducing into the reactor additional monomer(s) to replace the monomer(s) polymerized; and (g) withdrawing a polymer product from the reactor. In a preferred embodiment, the condensable fluid is introduced in a concentration greater than 0.5 mole percent, preferably greater than 1 mole percent, more preferably greater than 2 mole percent, still more preferably greater than 3 mole percent, even more preferably greater than 4 mole percent, still even more preferably greater than 5 mole percent, still even more preferably greater than 7 mole percent, still even more preferably greater than 10 mole percent, still even more preferably greater than 15 mole percent, still even more preferably greater than 20 mole percent, and most preferably greater than 25 mole percent, based on the total moles of gas in the reactor.

In any of the above processes of the invention, a preferred catalyst system or polymerization catalyst is a conventional-type transition metal catalyst such as a Ziegler-Natta-type catalyst and a Phillips-type catalyst, or a bulky ligand metallocene-type catalyst.

For purposes of this invention and the claims thereto the term "bed temperature" is defined to mean the temperature of the fluidized bed measured at an elevation at least one-half of the reactor diameter above the distributor plate and at a radial distance at least 0.1 times the reactor diameter from the wall of the reactor.

Any of the embodiments described herein are preferably operated, (preferably continuously) with a bed temperature below the Critical Temperature and with a dew point temperature within 25° C. of the bed temperature (preferably within 20° C. of the bed temperature, preferably within 15° C. of the bed temperature, preferably within 10° C. of the bed temperature, preferably within 5° C. of the bed temperature, preferably within 4° C. of the bed temperature, preferably within 3° C. of the bed temperature, preferably within 2° C. of the bed temperature, preferably within 1° C. of the bed temperature.

Any of the embodiments described herein are preferably continuously operated below the Critical Temperature for at least 12 hours, preferably at least 24 hours, preferably at least 36 hours, preferably at least 48 hours, preferably at least 72 hours, preferably at least 7 days, preferably at least 14 days, preferably at least 21 days, preferably at least 30 days.

In any of the embodiments described herein the reactor temperature is preferably within 10° C. below the Critical Temperature, preferably within 5° C. below the Critical Temperature.

In another embodiment, this invention is directed to a continuous process for polymerizing one or more hydrocarbon monomer(s), preferably a gas phase process, preferably operating in condensed mode, preferably operating with a fluidized bed, for polymerizing one or more olefin(s) in the presence of catalyst system or polymerization catalyst and a condensable fluid, preferably a condensable fluid comprising a C3 to C10 hydrocarbon, a fluorinated hydrocarbon or a combination thereof at a temperature less than the Z Temperature (where the Z Temperature is the heat seal initiation temperature of the polymer to be made minus the melting point depression of the polymer to be made) for a period of at least 12 hours preferably 24 hours. Melting point depression is measured as described above.

To determine heat seal initiation temperature, 100 kilograms of the polymer in question are melt homogenized on a Werner Pfleiderer Model ZSK-57 twin screw extruder and pelletized. The polymer is then converted into a film having a thickness of 1.5 to 2.0 mils (37.5 to 50 microns) using a 1 inch Killion Mini Cast Line, Model KLB 100. Heat seals are made from the films on a laboratory scale Theller Model EB heat sealer. A dwell time of about one second and a sealing pressure of 50 N/cm$^2$ are used for making the seals. The seals on the films are made in the transverse direction and the heat sealing anvils are insulated from the heat sealing film by a Mylar® film. The Mylar® film is very stable at normal heat sealing temperatures and is easily removed from the heat sealing polymer after the seal has been made. The seals are tested within 1 minute of sealing. For the strength test, the sealed samples are cut into 0.5 inch (1.27 cm) wide pieces and then strength tested using an Instron instrument at a crosshead speed of 20 inches/min (508 mm/min) and a 2 inch (5.08 cm) jaw separation. The free ends of the samples are fixed in the jaws, and then the jaws are separated at the strain rate until the seal fails. The peak load at the seal break is measured and the seal strength is calculated by diving the peak load by the sample width. The heat seal initiation temperature is determined by measuring the seal strengths of each sample sealed at various temperatures beginning at 50° C. below the polymer melting point (Tm) and then increasing at 2° C. intervals and then extrapolating from a plot of seal strength versus temperature to find the lowest temperature at which at least 0.5 N/cm seal strength is present. The heat seal initiation temperature is the lowest temperature at which at least 0.5 N/cm seal strength is present.

In an alternate embodiment, in any of the embodiments described herein the process is operated below the Z Temperature. In an alternate embodiment of any of the embodiments described herein the process is operated below the Z Temperature instead of below the Critical Temperature.

In another embodiment invention is directed to a continuous process for polymerizing one or more hydrocarbon monomer(s), preferably a gas phase process, preferably operating in condensed mode, preferably operating with a fluidized bed, for polymerizing one or more olefin(s) in the presence of catalyst system or polymerization catalyst and a condensable fluid, preferably a condensable fluid comprising a C3 to C10 hydrocarbon, a fluorinated hydrocarbon or a combination thereof at a temperature less than the Q Temperature (where the Q Temperature is the hot tack initiation temperature of the polymer to be made minus the melting point depression of the polymer to be made) for a period of at least 12 hours preferably 24 hours. Melting point depression is measured as described above.

Hot tack strength is measured in accordance with the following procedure. The hot tack samples are 15 mm wide specimens cut from cast films produced according to the procedure for heat seal initiation measurement above. The samples are back-taped (laminated) with 2 mil (approx. 50 microns) polyethylene terephthalate film to avoid rupture at the transition of the seal and elongation or sticking to the seal bars. A Hot Tack Tester 3000, from J&B (J & B Instruments BV, Heerlen, The Netherlands or J& B instruments USA, Inc., Spartanburg, S.C.), was employed to make the seal, using a seal bar pressure of 0.5 MPa, and a seal time of 0.5 sec. The hot tack force is then determined, after a cooling time of 0.4 seconds and at a peel speed of 200 mm/sec. The force at the seal break is measured and the hot tack strength is calculated by diving the hot tack force by the sample width. Hot tack initiation temperature is determined by measuring the hot tack strengths of each sample sealed at various temperatures beginning at 50° C. below the polymer melting point (Tm) and then increasing at 2° C. intervals and then extrapolating from a plot of hot tack strength versus temperature to find the lowest temperature at which at least 0.06 N/cm hot tack strength is present. The hot tack initiation temperature is the lowest temperature where an at least 0.06 N/cm hot tack strength is present.

In an alternate embodiment, in any of the embodiments described herein the process is operated below the Q Temperature. In an alternate embodiment of any of the embodiments described herein the process is operated below the Q Temperature instead of below the Critical Temperature.

Catalyst Components and Catalyst Systems

All polymerization catalysts including conventional-type transition metal catalysts are suitable for use in the polymerization process of the invention. The following is a non-limiting discussion of the various polymerization catalysts useful in the process of the invention. All numbers and references to the Periodic Table of Elements are based on the new notation as set out in Chemical and Engineering News, 63(5), 27 (1985). In the description herein the transition metal compound may be described as a catalyst precursor, a transition metal catalyst, a polymerization catalyst, or a catalyst compound, and these terms are used interchangeably. The term activator is used interchangeably with the term co-catalyst. A catalyst system is combination of a catalyst compound and an activator.

Conventional-Type Transition Metal Catalysts

Conventional-type transition metal catalysts are those traditional Ziegler-Natta-type catalysts and Phillips-type chromium catalysts well known in the art. Examples of conventional-type transition metal catalysts are discussed in U.S. Pat. Nos. 4,115,639, 4,077,904 4,482,687, 4,564,605, 4,721,763, 4,879,359 and 4,960,741, all of which are herein fully incorporated by reference. The conventional-type transition metal catalyst compounds that may be used in the present invention include transition metal compounds from Groups 3 to 10, preferably 4 to 6 of the Periodic Table of Elements.

These conventional-type transition metal catalysts may be represented by the formula:

$$MR_x \qquad (I)$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$ (ethyl acetate)$_4$ derivative is particularly preferred. British Patent Application 2,105,355, herein incorporated by reference, describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu is butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. The preferred conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

The conventional-type transition metal catalysts of the invention may also have the general formula:

$$M'_tM''X_{2t}Y_uE \qquad (II)$$

where M' is Mg, Mn and/or Ca; t is a number from 0.5 to 2; M" is a transition metal such as Ti, V and/or Zr; X is a halogen, preferably Cl, Br or I; Y may be the same or different and is halogen, alone or in combination with oxygen, —NR$_2$, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: MgTiCl$_5$.2CH$_3$COOC$_2$H$_5$, Mg$_3$Ti$_2$Cl$_{12}$.7CH$_3$COOC$_2$H$_5$, MgTiCl$_5$.6C$_2$H$_5$OH, MgTiCl$_5$.100CH$_3$OH, MgTiCl$_5$.tetrahydrofuran, MgTi$_2$Cl$_{12}$.7C$_6$H$_5$CN, Mg$_3$Ti$_2$Cl$_{12}$.6C$_6$H$_5$COOC$_2$H$_5$, MgTiCl$_6$.2CH$_3$COOC$_2$H$_5$, MgTiCl$_6$.6C$_5$H$_5$N, MnTiCl$_5$.4C$_2$H$_5$OH, MgTiCl$_5$(OCH$_3$).2CH$_3$COOC$_2$H$_5$, MgTiCl$_5$N(C$_6$H$_5$)$_2$.3CH$_3$COOC$_2$H$_5$, MgTiBr$_2$Cl$_4$.2(C$_2$H$_5$)$_2$O, Mg$_3$V$_2$Cl$_{12}$.7CH$_3$—COOC$_2$H$_5$, MgZrCl$_6$.4 tetrahydrofuran. Other catalysts may include cationic catalysts such as AlCl$_3$, and other cobalt and iron catalysts well known in the art.

Typically, these conventional-type transition metal catalyst compounds (excluding some conventional-type chromium catalyst compounds) are activated with one or more of the conventional-type cocatalysts described below.

Conventional-Type Cocatalysts

Conventional-type cocatalyst compounds for the above conventional-type transition metal catalyst compounds may be represented by the formula:

$$M^3M^4_vX^2_cR^3_{b-c} \quad (III)$$

wherein M$^3$ is a metal from Group 1, 2, 12 and 13 of the Periodic Table of Elements; M$^4$ is a metal of Group IA of the Periodic Table of Elements; v is a number from 0 to 1; each X$^2$ is any halogen; c is a number from 0 to 3; each R$^3$ is a monovalent hydrocarbon radical or hydrogen; b is a number from 1 to 4; and wherein b minus c is at least 1.

Other conventional-type organometallic cocatalyst compounds for the above conventional-type transition metal catalysts have the formula:

$$M^3R^3k \quad (IV)$$

where M$^3$ is a Group 1, 2, 12 or 13 metal, such as lithium, sodium, beryllium, barium, boron, aluminum, zinc, cadmium, and gallium; k equals 1, 2 or 3 depending upon the valency of M$^3$ which valency in turn normally depends upon the particular Group to which M$^3$ belongs; and each R$^3$ may be any monovalent hydrocarbon radical.

Non-limiting examples of conventional-type organometallic cocatalyst compounds of Groups 1, 2, 12 and 13 useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art, and a more complete discussion of these compounds may be found in U.S. Pat. Nos. 3,221,002 and 5,093,415, which are herein fully incorporated by reference.

For purposes of this patent specification and appended claims conventional-type transition metal catalyst compounds exclude those bulky ligand metallocene-type catalyst compounds discussed below. For purposes of this patent specification and the appended claims the term "cocatalyst" refers to conventional-type cocatalysts or conventional-type organometallic cocatalyst compounds.

In some embodiment, however, it is preferred that the catalyst system not comprise titanium tetrachloride, particularly not the combination of TiCl$_4$ and aluminum alkyl (such as triethylaluminum), particularly when the FC is a perfluorocarbon. In situations where the catalyst is titanium tetrachloride, particularly the combination of TiCl$_4$ and aluminum alkyl (such as triethylaluminum) the FC is preferably a hydrofluorocarbon. In another embodiment, the catalyst is not a free radical initiator, such as a peroxide.

Bulky Ligand Metallocene-Type Catalyst Compounds

Generally, polymerization catalysts useful in the invention include one or more bulky ligand metallocene compounds (also referred to herein as metallocenes). Typical bulky ligand metallocene compounds are generally described as containing one or more bulky ligand(s) and one or more leaving group(s) bonded to at least one metal atom. The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements; preferably the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

Exemplary of these bulky ligand metallocene-type catalyst compounds and catalyst systems are described in for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, the polymerization catalyst useful in the process of the invention includes one or more bulky ligand metallocene catalyst compounds represented by the formula:

$$L^A L^B MQ_n \quad (V)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of π-bonding to M. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of Formula V only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. In one embodiment, Q is a monoanionic labile ligand having a sigma-bond to M. Depending on the oxidation state of the metal, the value for n is 0, 1 or 2 such that Formula V above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In another embodiment, the polymerization catalysts useful in the process of the invention may include one or more bulky ligand metallocene catalyst compounds where $L^A$ and $L^B$ of Formula V are bridged to each other by at least one bridging group, A, as represented by:

$$L^A A L^B MQ_n \quad (VI)$$

wherein $L^A$, $L^B$, M, Q and n are as defined above. These compounds of Formula VI are known as bridged, bulky ligand metallocene catalyst compounds. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by R'$_2$C, R'$_2$Si, R'$_2$Si R'$_2$Si, R'$_2$Ge, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of Formula VI have two or more bridging groups A (EP-B1-0 664 301, which is incorporated herein by reference).

In another embodiment, the bulky ligand metallocene catalyst compounds are those where the R substituents on the bulky ligands $L^A$ and $L^B$ of Formulas V and VI are substituted with the same or different number of substituents on each of the bulky ligands. In another embodiment, the bulky ligands $L^A$ and $L^B$ of Formulas V and VI are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517 and 5,939,503 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In another embodiment, the catalyst compositions of the invention may include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198, 401, 5,227,440 and 5,264,405 and European publication EP-A-0 420 436, all of which are herein fully incorporated by reference.

In another embodiment, the polymerization catalyst useful in the process of the invention includes one or more bulky ligand metallocene catalyst compounds represented by Formula VII:

$$L^C AJMQ_n \qquad (VII)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to J and $L^C$; J is a heteroatom ancillary ligand; and A is a bridging group; Q is a univalent anionic ligand; and n is the integer 0, 1 or 2. In Formula VII above, $L^C$, A and J form a fused ring system.

In Formula VII, J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred. In a preferred embodiment, when the catalyst system comprises compounds represented by Formula VII, the fluorocarbon preferably is a hydrofluorocarbon. Preferably, when the catalyst system comprises compounds represented by Formula VII, the fluorocarbon is not a perfluorocarbon.

In an embodiment of the invention, the bulky ligand metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in PCT Publication Nos. WO 96/33202, WO 96/34021, WO 97/17379 and WO 98/22486 and EP-A1-0 874 005 and U.S. Pat. Nos. 5,233,049, 5,539,124, 5,554,775, 5,637,660, 5,744,417, 5,756,611 and 5,856,258 all of which are herein incorporated by reference.

In another embodiment, the bulky ligand metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In another embodiment, the polymerization catalysts useful in the process of the invention includes one or more bulky ligand metallocene catalyst compounds represented by Formula VIII:

$$L^D MQ_2(YZ)X_n \qquad (VIII)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and Q$_2$(YZ) forms a ligand, preferably a unicharged polydentate ligand; or Q is a univalent anionic ligand also bonded to M; X is a univalent anionic group when n is 2 or X is a divalent anionic group when n is 1; n is 1 or 2.

In Formula VIII, L and M are as defined above for Formula V. Q is as defined above for Formula V, preferably Q is selected from the group consisting of —O—, —NR—, —CR2— and —S—; Y is either C or S; Z is selected from the group consisting of —OR, —NR2, —CR3, —SR, —SiR3, —PR2, —H, and substituted or unsubstituted aryl groups, with the proviso that when Q is —NR— then Z is selected from one of the group consisting of —OR, —NR2, —SR, —SiR3, —PR2 and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

Still other useful polymerization catalysts include those multinuclear metallocene catalysts as described in PCT Publication No. WO 99/20665 and U.S. Pat. No. 6,010,794, and transition metal metaaracyle structures described in EP-A2-0 969 101, which are herein incorporated herein by reference. Other metallocene catalysts include those described in EP-A1-0 950 667, double cross-linked metallocene catalysts (EP-A1-0 970 074), tethered metallocenes (EP-A2-0 970 963) and those sulfonyl catalysts described in U.S. Pat. No. 6,008,394, which are incorporated herein by reference.

It is also contemplated that in one embodiment the bulky ligand metallocene catalysts, described above, include their structural or optical or enantiomeric isomers (meso and racemic isomers, for example see U.S. Pat. No. 5,852,143, incorporated herein by reference), chiral, achiral, and mixtures thereof.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In one embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT Publications Nos. WO 96/33202, WO 99/01481 and WO 98/42664, and U.S. Pat. No. 5,637,660, which are fully incorporated herein by reference.

In one embodiment, these catalyst compounds are represented by the formula:

$$((Z)XA_t(YJ))_qMQ_n \tag{IX}$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional.

In another embodiment, where X is nitrogen or phosphorous then Z is present. In an embodiment, Z is preferably an aryl group, more preferably a substituted aryl group.

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, the polymerization catalysts useful in the process of the invention include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414-6415 and Johnson, et al., "Copolymerization of Ethylene and Propylene with Functionalized Vinyl Monomers by Palladium(II) Catalysts", J. Am. Chem. Soc., 1996, 118, 267-268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene-type catalyst compounds useful herein are those diimine based ligands for Group 8 to 10 metal compounds disclosed in PCT publications WO 96/23010 and WO 97/48735 and Gibson, et. al., Chem. Comm., pp. 849-850 (1998), all of which are herein incorporated by reference.

Other bulky ligand metallocene-type catalysts useful herein are those Group 5 and 6 metal imido complexes described in EP-A2-0 816 384 and U.S. Pat. No. 5,851,945, which is incorporated herein by reference. In addition, bulky ligand metallocene-type catalysts useful herein include bridged bis(arylamido) Group 4 compounds described by D. H. McConville, et al., in Organometallics 1195, 14, 5478-5480, which is herein incorporated by reference. Other bulky ligand metallocene-type catalysts useful herein are described as bis(hydroxy aromatic nitrogen ligands) in U.S. Pat. No. 5,852,146, which is incorporated herein by reference. Other metallocene-type catalysts containing one or more Group 15 atoms useful herein include those described in WO 98/46651, which is herein incorporated herein by reference. Still another metallocene-type bulky ligand metallocene-type catalysts useful herein include those multinuclear bulky ligand metallocene-type catalysts as described in WO 99/20665, which is incorporated herein by reference. In addition, useful Group 6 bulky ligand metallocene catalyst systems are described in U.S. Pat. No. 5,942,462, which is incorporated herein by reference.

It is contemplated in some embodiments that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

Mixed Catalysts

It is also within the scope of this invention that the above described bulky ligand metallocene-type catalyst compounds can be combined with one or more of the conventional-type transition metal catalysts compounds with one or more co-catalysts or activators or activation methods described above. For example, see U.S. Pat. Nos. 4,937,299, 4,935,474, 5,281,679, 5,359,015, 5,470,811, and 5,719,241, all of which are fully incorporated herein by reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210, 559, 4,263,422, 4,672,096, 4,918,038, 5,198,400, 5,237,025, 5,408,015 and 5,420,090, all of which are herein incorporated by reference.

Activator and Activation Methods

The above described polymerization catalysts, particularly bulky ligand metallocene-type catalyst, are typically activated in various ways to yield polymerization catalysts having a vacant coordination site that will coordinate, insert, and polymerize olefin(s).

For the purposes of this invention, the term "activator" is defined to be any compound which can activate any one of the polymerization catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts.

Alumoxanes

In one embodiment, alumoxane activators are utilized as an activator with the polymerization catalysts useful in the process of the invention. Alumoxanes are generally oligomeric compounds containing —Al(R)—O— subunits, where R is an alkyl group. Non-limiting examples of alumoxanes include methylalumoxane (MAO), modified methylalumoxane (MMAO), ethylalumoxane and isobutylalumoxane. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. Another alumoxane is a modified methyl alumoxane (MMAO) cocatalyst type 3A (commercially available from Akzo Chemicals, Inc. under the trade name Modified Methylalumoxane type 3A; see U.S. Pat. No. 5,041,584). Aluminum alkyl or organoaluminum compounds which may be utilized as activators include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri(n-butyl)ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Non-limiting examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds for the polymerization catalysts described above may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

In a preferred embodiment, the stoichiometric activators include a cation and an anion component, and may be represented by the following formula:

$$(L-H)_d^+ \cdot (A^{d-}) \qquad (X)$$

wherein: L is a neutral Lewis base; H is hydrogen; $(L-H)^+$ is a Bronsted acid; $A^{d-}$ is a non-coordinating anion having the charge d−; and d is an integer from 1 to 3. The cation component, $(L-H)_d^+$ may include Bronsted acids such as protons or protonated Lewis bases or reducible catalysts capable of protonating or abstracting a moiety, such as an akyl or aryl, from the bulky ligand metallocene or Group 15 containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene and mixtures thereof. The activating cation $(L-H)_d^+$ may also be an abstracting moiety such as silver, carboniums, tropylium, carbeniums, ferroceniums and mixtures, preferably carboniums and ferroceniums. Most preferably $(L-H)_d^+$ is triphenyl carbonium.

The anion component $A^{d-}$ includes those having the formula $[M^{k+}Q_n]^{d-}$ wherein k is an integer from 1 to 3; n is an integer from 2-6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic stoichiometric activator $(L-H)_d^+ \cdot (A^{d-})$ is N,N-dimethylanilinium tetra(perfluorophenyl)borate or triphenylcarbenium tetra(perfluorophenyl)borate.

In one embodiment, an activation method using ionizing ionic compounds not containing an active proton but capable of producing a bulky ligand metallocene catalyst cation and their non-coordinating anion are also contemplated, and are described in EP-A-0 426 637, EP-A-0 573 403 and U.S. Pat. No. 5,387,568, which are all herein incorporated by reference.

Additional Activators

Other activators include those described in PCT Publication No. WO 98/07515 such as tris(2,2',2''-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT Publications Nos. WO 94/07928 and WO 95/14044 and U.S. Pat. Nos. 5,153,157 and 5,453,410, all of which are herein fully incorporated by reference.

Other suitable activators are disclosed in PCT Publication No. WO 98/09996, incorporated herein by reference, which describes activating bulky ligand metallocene catalyst compounds with perchlorates, periodates and iodates including their hydrates. WO 98/30602 and WO 98/30603, incorporated by reference, describe the use of lithium (2,2'-bisphenyl-ditrimethylsilicate).4THF as an activator for a bulky ligand metallocene catalyst compound. PCT Publication No. WO 99/18135, incorporated herein by reference, describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins.

Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl)borane) benzimidazolide), which are herein incorporated by reference.

Another suitable ion forming, activating cocatalyst comprises a salt of a cationic oxidizing agent and a noncoordinating, compatible anion represented by the formula:

$$(OX^{e+})_d(A^{d-})_e \qquad (XII)$$

wherein: $OX^{e+}$ is a cationic oxidizing agent having a charge of e+; e is an integer from 1 to 3; and $A^-$, and d are as previously defined above. Non-limiting examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activators, especially tetrakis(pentafluorophenyl)borate.

It within the scope of this invention that any of the polymerization catalysts described above can be combined one or more activators or activation methods described above. For example, a combination of activators have been described in U.S. Pat. Nos. 5,153,157 and 5,453,410, European publication EP-B1 0 573 120, and PCT publications WO 94/07928 and WO 95/14044. These documents all discuss the use of an alumoxane and an ionizing activator with a bulky ligand metallocene catalyst compound.

Supported Activators

Many supported activators are useful in combination with one or more of the polymerization catalysts, especially the bulky ligand metallocene-type catalysts described above. A supported activator is where any one or more of the activators described above is supported on any one or more of the support materials described below. Non-limiting supported activators and methods for making them are described in various patents and publications which include: U.S. Pat. Nos. 4,871,705, 4,912,075, 4,935,397, 4,937,217, 4,937,301, 5,008,228, 5,015,749, 5,026,797, 5,057,475, 5,086,025, 5,147,949, 5,212,232, 5,229,478, 5,288,677, 5,332,706, 5,420,220, 5,427,991, 5,446,001, 5,468,702, 5,473,028, 5,534,474, 5,602,067, 5,602,217, 5,643,847, 5,728,855, 5,731,451, 5,739,368, 5,756,416, 5,777,143, 5,831,109, 5,856,255, 5,902,766, 5,910,463, 5,968,864 and 6,028,151 6,147,173; PCT Publications Nos. WO 94/26793, WO 96/16092, WO 98/02246 and WO 99/03580; and European Publication Nos. EP-B1-0 662 979, EP 0 747 430 A1, EP 0 969 019 A1, EP-B2-0 170 059, EP-A1-0 819 706 and EP-A1-0 953 581, which are all herein fully incorporated herein by reference.

Method for Supporting

The above described bulky ligand metallocene-type catalyst compounds and catalyst systems and conventional-type transition metal catalyst compounds and catalyst systems, may be combined with one or more support materials or carriers using one of the support methods well known in the art or as described below. In the preferred embodiment, the polymerization catalyst is in a supported form. For example, in a preferred embodiment, a bulky ligand metallocene-type catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, preferably an inorganic oxide, has a surface area in the range of from about 10 to about 700 $m^2/g$, pore volume in the range of from about 0.1 to about 4.0 cc/g and average particle size in the range of from about 10 to about 500 μm. More preferably, the surface area of the carrier is in the range of from about 50 to about 500 $m^2/g$, pore volume of from about 0.5 to about 3.5 cc/g and average particle size of from about 20 to about 200 μm. Most preferably the surface area of the carrier is in the range of from about 100 to about 400 $m^2/g$, pore volume from about 0.8 to about 3.0 cc/g and average particle size is from about 20 to about 100 μm. The average pore size of a carrier of the invention is typically in the range of from about 10 Å to 1000 Å, preferably 50 Å to about 500 Å, and most preferably 75 Å to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,648,310, 5,665,665, 5,698,487, 5,714,424, 5,723,400, 5,723,402, 5,731,261, 5,743,202, 5,759,940, 5,767,032, 5,688,880, 5,770,755 and 5,770,664, and U.S. application Ser. Nos. 271,598 filed Jul. 7, 1994 and 788,736 filed Jan. 23, 1997 and PCT publications WO 95/32995, WO 95/14044, WO 96/06187, WO96/11960 and WO96/00243, which are herein fully incorporated by reference.

Examples of supporting the conventional-type catalyst systems of the invention are described in U.S. Pat. Nos. 4,894,424, 4,376,062, 4,395,359, 4,379,759, 4,405,495 4,540,758 and 5,096,869, all of which are herein incorporated by reference.

In one preferred embodiment, the support materials are treated chemically, for example with a fluoride compound as described in PCT Publication No. WO 00/12565, which is herein incorporated by reference. Other supported activators are described in for example PCT Publication No. WO 00/13792 that refers to supported boron containing solid acid complex.

In one embodiment of the invention, olefin(s), preferably $C_2$ to $C_{30}$ olefin(s) or alpha-olefin(s), preferably ethylene or propylene or combinations thereof are prepolymerized in the presence of the bulky ligand metallocene-type catalyst system and/or a conventional-type transition metal catalysts prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,467,080, 4,748,221, 4,789,359, 4,921,825, 5,204,303, 5,283,278, 5,322,830, 5,705,578, 6,391,987, 6,531,553, and 6,610,799, European Publication EP-B-0279 863 and PCT Publication No. WO 97/44371, all of which are herein fully incorporated by reference. In a gas phase prepolymerization process it is preferred to use a fluorinated hydrocarbon as a diluent, alone or in combination with other liquids. A prepolymerized catalyst system for purposes of this patent specification and appended claim is a supported catalyst system.

In one embodiment the polymerization catalyst is used in an unsupported form, preferably in a liquid form such as described in U.S. Pat. Nos. 5,317,036 and 5,693,727, PCT publication WO 97/46599 and European publication EP-A-0 593 083, all of which are herein incorporated by reference.

Polymerization Process

The polymerization catalysts and catalyst systems described above are suitable for use in any gas phase polymerization process, including fluidized bed or stirred bed processes. Particularly preferred is a gas phase polymerization process in which one or more condensable fluids as described below is utilized.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. In a preferred process, a condensable fluid as described below, is introduced to the process for purposes of increasing the cooling capacity of the recycle stream. The purposeful introduction of a condensable fluid into a gas phase process is a condensed mode process. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

Condensable Fluids

There are generally two types of condensable materials employed in gas phase reactor systems, comonomers and Induced Condensing Agents (ICAs). The comonomers are typically used to control the resin product density. Common comonomers employed in gas phase reactors are 1-butene, 1-hexene, and 4-methyl-1-pentene. These comonomers are considered condensable gases because (depending on concentration) they are relatively easily condensed at the typical inlet gas temperatures of 30 to 35° C. In contrast, ethylene, nitrogen and hydrogen in the reaction system are not typically condensable at these temperatures.

The second class of condensable gases in the reactor are the ICAs. The most common type of ICA is isopentane, but isobutane, n-hexane, or other hydrocarbons (or HFCs) of similar boiling points may also be used. The role of the ICAs is to raise the dew point temperature of the reactor gas, so as to induce more condensing at the cooler reactor inlet gas conditions. The enhanced condensing that this provides gives additional reactor cooling capacity and enables higher production rates from the reactor. The use of ICAs is further explained U.S. Pat. Nos. 5,352,749, 5,405,922, and 5,436,304.

The condensable fluid useful in this invention are preferably inert to the catalyst, reactants and the polymer product produced; it may also include comonomers. The condensable fluids can be introduced into the reaction/recycle system or at any other point in the system. For the purposes of this invention and the claims thereto the term condensable fluids includes saturated or unsaturated hydrocarbons and saturated or unsaturated fluorinated hydrocarbons, including perfluorocarbons and hydrofluorocarbons. Examples of suitable inert condensable fluids are readily volatile liquid hydrocarbons, which may be selected from saturated hydrocarbons containing from 2 to 10 carbon atoms, preferably 3 to 10 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons or mixtures thereof. A class of preferred inert condensable hydrocarbons are $C_5$ and $C_6$ saturated hydrocarbons. Another class of preferred hydrocarbons are $C_4$ to $C_6$ saturated hydrocarbons. Preferred hydrocarbons for use as condensable fluids include pentanes, such as isopentane. The condensable fluids may also include polymerizable condensable comonomers such as olefins, diolefins or mixtures thereof including some of the monomers mentioned herein which may be partially or entirely incorporated in the polymer product. Preferably, the feed or recycle stream contains from about 5 to about 60 mole percent of a condensable fluid, preferably with the condensable fluid having one carbon atom less than the comonomer or at least one carbon atom less than the comonomer.

Another class of condensable fluids useful herein include fluorinated hydrocarbons, preferably having little to no solvent power regarding the reaction components such as the monomer and polymer products. In one embodiment, one or more fluorinated hydrocarbons or perfluorinated carbons are utilized as condensable fluids in the process of the invention.

Fluorinated hydrocarbons are defined to be compounds consisting essentially of at least one carbon atom and at least one fluorine atom, and optionally at least one hydrogen atom. A perfluorinated carbon is a compound consisting essentially of carbon atom(s) and fluorine atom(s), and includes for example linear branched or cyclic, $C_1$ to $C_{40}$ perfluoroalkanes, preferably $C_{11}$ to $C_{40}$ perfluoroalkanes. In one embodiment, the condensable fluids, preferably the perfluorinated carbons exclude perfluorinated $C_{4\text{-}10}$ alkanes.

In one embodiment, the fluorinated hydrocarbons are represented by the formula:

$$C_xH_yF_z \qquad \text{(XII)}$$

wherein x is an integer from 1 to 40, preferably from 1 to 30, more preferably from 1 to 20, even more preferably from 1 to 10, and still even more preferably from 1 to 6, alternatively x is an integer from 2 to 20, preferably from 3 to 10, more preferably from 3 to 6, and most preferably from 1 to 3, and wherein y is greater than or equal 0 and z is an integer and at least one, more preferably, y and z are integers and at least one. In a preferred embodiment, z is 2 or more.

In one embodiment, a mixture of fluorinated hydrocarbons are used as the condensable fluids in the process of the invention, preferably a mixture of a perfluorinated carbon and a fluorinated hydrocarbon, and more preferably a mixture of fluorinated hydrocarbons. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4,4-nonafluorobutane; 1,1,1,2,2,3,4,4,4-nonafluorobutane; 1,1,1,2,2,3,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. Particularly preferred fluorinated hydrocarbons include difluoromethane, trifluoromethane, 1,1-difluoroethane, 1,1,1-trifluoroethane, fluoromethane, and 1,1,1,2-tetrafluoroethane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included.

In another embodiment the condensable fluids, such as fluorinated hydrocarbons, are used in combination with one or more inert gases such as carbon dioxide, nitrogen, hydrogen, argon, neon, helium, krypton, zenon, and the like. In the preferred embodiment, the inert gas is nitrogen.

In another preferred embodiment, the fluorinated hydrocarbon used in the process of the invention are selected from the group consisting of difluoromethane, trifluoromethane, 1,1-difluoroethane, 1,1,1-trifluoroethane, and 1,1,1,2-tetrafluoroethane and mixtures thereof.

In one particularly preferred embodiment, the commercially available fluorinated hydrocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane and/or HFC-365mfc, all of these are commercially available fluorinated hydrocarbons.

In another embodiment, the condensable fluid is not a perfluorinated C4 to C10 alkane. In another embodiment, the condensable fluid is not a perfluorinated hydrocarbon. In another embodiment, the condensable fluid is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons. In a particularly preferred embodiment, the condensable fluid consists essentially of hydrofluorocarbons.

In another embodiment the fluorocarbon is present at more than 1 weight %, based upon the weight of the condensable fluid (fluorocarbon and any hydrocarbon solvent) present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons useful herein have a molecular weight (MW) greater than 90 a.m.u., preferably greater than 95 a.m.u, and more preferably greater than 100 a.m.u. In another embodiment, the fluorinated hydrocarbons useful herein have a MW greater than 120 a.m.u, preferably greater than 125 a.m.u, even more preferably greater than 130 a.m.u, and most preferably greater than 140 a.m.u. In still another embodiment, the fluorinated hydrocarbons useful herein have a MW greater than 125 a.m.u, preferably greater than 130 a.m.u, even more preferably greater than 135 a.m.u, and most preferably greater than 150 a.m.u. In another embodiment, the fluorinated hydrocarbons useful herein have a MW greater than 140 a.m.u, preferably greater than 150 a.m.u, more preferably greater than 180 a.m.u, even more preferably greater than 200 a.m.u, and most preferably greater than 225 a.m.u. In an embodiment, the fluorinated hydrocarbons useful herein have a MW in the range of from 90 a.m.u to 1000 a.m.u, preferably in the range of from 100 a.m.u to 500 a.m.u, more preferably in the range of from 100 a.m.u to 300 a.m.u, and most preferably in the range of from about 100 a.m.u to about 250 a.m.u.

In yet another embodiment, the fluorinated hydrocarbons useful herein have normal boiling points in the range of from about −50° C. up to the polymerization temperature, preferably a polymerization temperature of about 85° C., preferably the normal boiling points of the fluorinated hydrocarbons are in the range of from −40° C. to about 70° C., more preferably from about −30° C. to about 60° C., and most preferably from about −30° C. to about 55° C. In an embodiment, the fluorinated hydrocarbons useful herein have normal boiling points greater than −30° C., preferably greater than −30° C. to less than −1° C. In a further embodiment, the fluorinated hydrocarbons useful herein have normal boiling points greater than −5° C., preferably greater than −5° C. to less than −20° C. In one embodiment, the fluorinated hydrocarbons useful herein have normal boiling points greater than 30° C., preferably greater than 30° C. to about 60° C.

In another embodiment, the fluorinated hydrocarbons useful herein have a liquid density at 20° C. (g/cc) greater than 1 g/cc, preferably greater than 1.10, and most preferably greater than 1.20 g/cc. In one embodiment, the fluorinated hydrocarbons useful herein have a liquid density at 20° C. (g/cc) greater than 1.20 g/cc, preferably greater than 1.25, and most preferably greater than 1.30 g/cc. In an embodiment, the fluorinated hydrocarbons useful herein have a liquid density at 20° C. (g/cc) greater than 1.30 g/cc, preferably greater than 1.40, and most preferably greater than 1.50 g/cc.

In one embodiment, the fluorinated hydrocarbons useful herein have a Heat of Vaporization (ΔH Vaporization) as measured by standard calorimetry techniques in the range between 100 kJ/kg to less than 300 kJ/kg, preferably in the range of from 110 kJ/kg to less than 300 kJ/kg, and most preferably in the range of from 120 kJ/kg to less than 300 kJ/kg.

In another preferred embodiment, the fluorinated hydrocarbons useful herein have any combination of two or more of the aforementioned MW, normal boiling point, ΔH Vaporization, and liquid density values and ranges. In a preferred embodiment, the fluorinated hydrocarbons useful in the process of the invention have a MW greater than 90 a.m.u, preferably greater than 100 a.m.u, and a liquid density greater than 1.00 g/cc, preferably greater than 1.20 g/cc. In yet another preferred embodiment, the fluorinated hydrocarbons useful in the process of the invention have a liquid density greater than 1.10 g/cc, preferably greater than 1.20 g/cc, and a normal boiling point greater than −50° C., preferably greater than −30° C. up to the polymerization temperature of the process, which is as high as 10° C., preferably less than 85° C., and more preferably less than 75° C., and most preferably less than 60° C. In one embodiment, the fluorinated hydrocarbons useful in the process of the invention have a MW greater than 90 a.m.u, preferably greater than 100 a.m.u, and a ΔH Vaporization in the range of from 100 kJ/kg to less than 300 kJ/kg, and optionally a liquid density greater than 1.00 g/cc, preferably greater than 1.20 g/cc. In yet another embodiment, the fluorinated hydrocarbons useful in the process of the invention have a liquid density greater than 1.10 g/cc, preferably greater than 1.20 g/cc, and a normal boiling point greater than −50° C., preferably greater than −30° C. up to the polymerization temperature of the process, which is as high as 100° C., preferably less than 85° C., and more preferably less than 75° C., and most preferably less than 60° C., and optionally a ΔH Vaporization in the range of from 120 kJ/kg to less than 250 kJ/kg.

In yet another embodiment, one or more fluorinated hydrocarbon(s), alone or in combination, with one or more inert, readily volatile liquid hydrocarbons, which include, for example, saturated hydrocarbons containing from 3 to 8 carbon atoms, such as propane, n-butane, isobutane (MW of 58.12 a.m.u, a liquid density of 0.55 g/cc, and normal boiling point as above described of −11.75), n-pentane, isopentane (MW of 72.15 a.m.u, a liquid density of 0.62 g/cc, and normal boiling point of 27.85), neopentane, n-hexane, isohexane, and other saturated $C_6$ to $C_8$ hydrocarbons.

In another embodiment, the fluorinated hydrocarbon(s) is selected based upon its solubility or lack thereof in a particular polymer being produced. Preferred fluorinated hydrocarbon(s) have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the fluorinated hydrocarbon(s), exposed for 90 seconds to evaporate excess condensable fluid from the surface of the film, and weighed. The mass uptake is defined as the percentage increase in the film weight after soaking. The fluorinated hydrocarbon or fluorinated hydrocarbon mixture is selected so that the polymer has a mass uptake of less than 4 wt %, preferably less than 3 wt %, more preferably less than 2 wt %, even more preferably less than 1 wt %, and most preferably less than 0.5 wt %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an FC's does not influence the polymerization reactions, in fact, it may do so to some extent, such as affecting activity rates. However, it is meant to say that the FC's are not present as part of the catalyst system.)

In a preferred embodiment, the fluorinated hydrocarbon (s) or mixtures thereof, are selected such that the polymer melting temperature Tm is reduced (or depressed) by not more than 15° C. by the presence of the condensable fluid. The depression of the polymer melting temperature ΔTm is determined by first measuring the melting temperature of a pure polymer (Tm) by differential scanning calorimetry (DSC), and then comparing this to a similar measurement on a sample of the same polymer that has been soaked with the condensable fluid. In general, the melting temperature of the soaked polymer will be lower than or equal to that of the dry polymer. The difference in these measurements is taken as the melting point depression ΔTm. It is well known to those in the art that higher concentrations of dissolved materials in the polymer cause larger depressions in the polymer melting temperature (i.e. higher values of ΔTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the condensable fluid to be evaluated). As described in the reference above, it is important to ensure that the second part of the test, conducted in the presence of the liquid, is done in a sealed container so that the liquid is not flashed during the test, which could introduce experimental error.

In one embodiment, the ΔTm of polymers in the presence of the condensable fluid, especially the polymers made in the presence of fluorinated hydrocarbon, is less than 12° C., preferably less than 10° C., preferably less than 8° C., more preferably less than 6° C., and most preferably less than 4° C. below the pure polymer Tm, as defined above. In another embodiment, the measured ΔTm is less than 5° C., preferably less than 4° C., more preferably less than 3° C., even more preferably less than 2° C., and most preferably less than 1° C. than the pure polymer Tm as measured above.

Monomers

Polymers produced according to this invention are olefin polymers or "polyolefins". By olefin polymers is meant that at least 75 mole % of the polymer is made of hydrocarbon monomers, preferably at least 80 mole %, preferably at least 85 mole %, preferably at least 90 mole %, preferably at least 95 mole %, preferably at least 99 mole %. In a particularly preferred embodiment, the polymers are 100 mole % hydrocarbon monomer. Hydrocarbon monomers are monomers made up of only carbon and hydrogen. In another embodiment of the invention up to 25 mol % of the polyolefin is derived from heteroatom containing monomers. Heteroatom containing monomers are hydrocarbon monomers where one or more hydrogen atoms have been replaced by a heteroatom. In a preferred embodiment, the heteroatom is selected from the group consisting of chlorine, bromine, oxygen, nitrogen, silicon and sulfur, preferably the heteroatom is selected from the group consisting of oxygen, nitrogen, silicon and sulfur, preferably the heteroatom is selected from the group consisting of oxygen and nitrogen, preferably oxygen. In a preferred embodiment, the heteroatom is not fluorine. In another embodiment of the invention, the monomers to be polymerized are not fluormonomers. Fluoromonomers are defined to be hydrocarbon monomers where at least one hydrogen atom has been replaced by a fluorine atom. In another embodiment of the invention, the monomers to be polymerized are not halomonomers. (By halomonomer is meant a hydrocarbon monomer where at least one hydrogen atom is replaced by a halogen.) In another embodiment of the invention, the monomers to be polymerized are not vinyl aromatic hydrocarbons. In another embodiment of the invention, the monomers to be polymerized are preferably aliphatic or alicyclic hydrocarbons. (as defined under "Hydrocarbon" in Hawley's Condensed Chemical Dictionary, 13th edition, R. J. Lewis ed., John Wiley and Sons, New York, 1997. In another embodiment of the invention, the monomers to be polymerized are preferably linear or branched alpha-olefins, preferably C2 to C40 linear or branched alpha-olefins, preferably C2 to C20 linear or branched alpha-olefins, preferably ethylene, propylene, butene, pentene, hexene, heptene, octene, nonene, decene, undecene, dodecene, or mixtures thereof, more preferably ethylene, propylene, butene hexene and octene.

In one embodiment, the process of this invention is directed toward a gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, ethylidene norbornene, isoprene, dicyclopentadiene and cyclopentene.

In a preferred embodiment of the process of the invention, a copolymer of ethylene is produced, where the ethylene and a comonomer having at least one alpha-olefin having from 3 to 15 carbon atoms, preferably from 4 to 12 carbon atoms, and most preferably from 4 to 8 carbon atoms, are polymerized in a gas phase process.

In another embodiment of the process of the invention, ethylene or propylene is polymerized with at least two different comonomers, optionally one of which may be a diene, to form a terpolymer.

Condensed Mode Process

In a preferred gas phase process of the invention, the gas phase process is operated in a condensed mode, where an inert condensable fluid as described above, especially a $C_2$ to $C_{10}$ saturated hydrocarbon and/or a fluorinated hydrocarbon, is introduced to the process to increase the cooling capacity of the recycle stream. These inert condensable fluids are referred to as induced condensing agents or ICA's. In another embodiment the invention relates to a gas phase process for polymerizing one or more olefin(s), preferably at least one of which is ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid is greater than 5 weight percent, preferably greater than 10 weight percent, or greater than 15 weight percent or greater than 20 weight percent, more preferably greater than 25 weight percent, even more preferably greater than 30 weight percent, still even more preferably greater than 35 weight percent, and most preferably greater than 30 weight percent up to 60 weight percent, preferably 50 weight percent, based on the total weight of the liquid and gas entering the reactor. For further details of a condensed mode process see U.S. Pat. Nos. 5,342,749 and 5,436,304 both of which are herein fully incorporated herein by reference.

To achieve higher cooling capacities, and enable higher reactor production rates, it is desirable to raise the dew point temperature of the recycle stream to permit a higher level of condensing at the inlet to the gas phase reactor. The dew point temperature of the recycle stream is typically raised by increasing the operating pressure of the reaction/recycle system and/or increasing the percentage of condensable fluids (ICA's and/or comonomers) and decreasing the percentage of non-condensable gases in the recycle stream. The advantages of a process operating in condensed mode generally increase directly with the nearness of the dew point temperature of the recycle steam to the reaction temperature within the interior of the fluidized bed. The advantages of the process may increase directly with the percentage of liquid in the recycle stream returned to the reactor. For a given inlet gas temperature, higher dew point temperatures cause an increased level of condensing (higher weight percent condensed). The higher condensing levels provide additional cooling and hence higher production rate capability in the reactor.

In one preferred embodiment of the invention, the invention is directed to a process, preferably a continuous process, for polymerizing monomer(s) in a reactor, said process comprising the steps of: (a) introducing a recycle stream into the reactor (optionally an insulated reactor), the recycle stream comprising one or more monomer(s); (b) introducing a polymerization catalyst and a condensable fluid, preferably a C2 to C10 saturated hydrocarbon and/or a fluorinated hydrocarbon, into the reactor where the reactor temperature is below the Critical Temperature, optionally for more than 12 hours; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In a most preferred embodiment, the condensable fluid is introduced in amount greater than 5 weight percent or greater than 10 weight percent or greater than 15 weight percent or greater than 20 weight percent, preferably greater than 25 weight percent, more preferably greater than 30 weight percent, and most preferably greater than 40 weight percent based on the total weight of fluidizing medium being reintroduced into the reactor.

In another preferred embodiment of the invention, the invention is directed to a process, preferably a continuous process, for polymerizing monomer(s) in a reactor, said process comprising the steps of: (a) introducing a recycle stream into the reactor (optionally an insulated reactor), the recycle stream comprising one or more monomer(s); (b) introducing a polymerization catalyst and a condensable fluid, preferably a C2 to C10 hydrocarbon and/or a fluorinated hydrocarbon, into the reactor where the reactor bed temperature is below the Critical Temperature and preferably the dew point temperature is within 25° C. of the bed temperature, optionally for more than 12 hours; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer (s) to replace the monomer(s) polymerized; and (g) withdrawing a polymer product from the reactor. In this embodiment, the condensable fluid is introduced in a concentration greater than 0.5 mole percent, preferably greater than 1 mole percent, preferably greater than 2 mole percent, more preferably greater than 3 mole percent, even more preferably greater than 4 mole percent, still even more preferably greater than 5 mole percent, and most preferably greater than 7 mole percent, based on the total moles of gas in the reactor.

Other gas phase processes in which can be practiced below the Critical temperature with or without an insulated reactor include those described in U.S. Pat. Nos. 5,627,242, 5,665,818 and 5,677,375, and European publications EP-A-0 794 200, EP-A-0 802 202, EP-A2 0 891 990 and EP-B-634 421, all of which are herein fully incorporated by reference.

Reactor Conditions

The reactor pressure in any of the gas phase processes described in the above embodiments vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor bed temperature in any of the gas phase processes described in the above embodiments may vary from about 30° C. to about 120° C., preferably from about 60° C. to about 115° C., more preferably in the range of from about 70° C. to 110° C., and most preferably in the range of from about 70° C. to about 100° C. In another embodiment, the bed temperature is above room temperature (23° C.), preferably above 30° C., preferably above 50° C., preferably above 70° C.

In a preferred embodiment, in any of the gas phase processes described in the above embodiments, the process is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr), and most preferably greater than 65,000 lbs/hr (29,000 Kg/hr) to greater than 100,000 lbs/hr (45,500 Kg/hr)

In a preferred embodiment of the process of invention in any of the embodiments described herein, the condensable fluid is used in an amount such that the molar ratio of the condensable fluid(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio of from 500:1 to 20,000:1, preferably from 500:1 to 10,000:1, preferably from 900:1 to 8000:1, even more preferably from 2000:1 to 5000:1, and most preferably from to 2000:1 to 3500:1. In another preferred embodiment of the process of invention in any of the embodiments described herein, the fluorinated hydrocarbon is used in an amount such that the molar ratio of the one or more fluorinated hydrocarbon(s) to the metal of one or more of the polymerization catalyst(s) or catalyst system(s), especially where the metal is from a Group 3 though 12 metal, preferably a Group 3 through 8 metal, and most preferably a Group 4 through 6 metal, is in the molar ratio greater than 500:1, preferably greater than from 900:1, even more preferably greater than 1000:1, still even more preferably greater than 2000:1, still even more preferably greater than 3000:1, still even more preferably greater than 10,000:1, and most preferably greater than 20,000:1. In the above embodiments, the most preferable metals are the transition metals, preferably Group 4 through 6 transition metals including titanium, hafnium, zirconium, chromium and vanadium.

In another preferred embodiment of any of the embodiments of the process of invention herein, the amount of one or more condensable fluids is determined by the partial pressure of the one or more fluorinated hydrocarbon(s) being introduced to the process, particularly into the reactor. In this embodiment, the partial pressure of the condensable fluid (preferably a C2 to C10 saturated hydrocarbon and/or one or more fluorinated hydrocarbons) is in the range of from 1 psia (6.9 kPa) to 500 psia (3448 kPa), preferably is in the range from about 2 psig (13.8 kPa) to about 250 psia (1724 kPa), more preferably is in the range from 2 psia (13.8 kPa) to 100 psia (690 kPa), still more preferably in the range from about 5 psia (34.5 kPa) to 90 psia (621 kPa), and most preferably in the range of from 5 psia (34.5 kPa) to about 80 psia (552 kPa).

In any of the embodiments described herein, the fluorinated hydrocarbon is present at 5 mole % or more, based upon the moles of fluorinated hydrocarbon, hydrocarbon solvent and monomers present in the reactor, alternately at 10 mole % or more, alternately at 15 mole % or more, alternately at 20 mole % or more, alternately at 25 mole % or more, alternately at 30 mole % or more, alternately at 35 mole % or more, alternately at 40 mole % or more, alternately at 45 mole % or more, alternately at 50 mole % or more, alternately at 55 mole % or more, alternately at 60 mole % or more, alternately at 65 mole % or more.

Polymer Product of the Invention

The polymers produced by the process of the invention are useful in making a wide variety of products and useful in many end-use applications. The polymers produced by the process of the invention include linear low density polyethylenes, elastomers, plastomers, high density polyethylenes, low density polyethylenes, polypropylene and polypropylene copolymers.

The polymers produced, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc.

In one embodiment, the polymers produced by the process of the invention typically have a molecular weight distribution, a weight average molecular weight to number average molecular weight ($M_w/M_n$) of greater than 1.5 to about 30, particularly greater than 2 to about 15, more preferably greater than 2 to about 10, even more preferably greater than about 2.2 to less than about 8, and most preferably from 2.5 to 8. The ratio of $M_w/M_n$ is measured by gel permeation chromatography techniques well known in the art.

In yet another embodiment, the ethylene-based polymers produced by the process of the invention typically have a narrow or broad composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference. Typically when a bulky ligand metallocene-type polymerization catalyst is utilized in the process of the invention producing an ethylene copolymer, terpolymer and the like, the CDBI's are generally in the range of greater than 50% to 99%, preferably in the range of 55% to 85%, and more preferably 60% to 80%, even more preferably greater than 60%, still even more preferably greater than 65%. Typically when a conventional-type transition metal polymerization catalyst is utilized in the process of the invention producing an ethylene copolymer, terpolymer and the like, the CDBI's are generally less than 50%, more preferably less than 40%, and most preferably less than 30%. Also, whether a bulky ligand metallocene-type polymerization catalyst or a conventional-type transition metal polymerization catalyst is being used and the process is making an ethylene homopolymer, the CDBI is 100%.

Generally, the polymers produced by the process of the invention in one embodiment have a melt index (MI) or ($I_2$)

as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. Also, generally, the polymers of the invention in an embodiment have a melt index ratio ($I_{21}/I_2$) ($I_{21}$ is measured by ASTM-D-1238-F) of from 10 to less than 25, more preferably from about 15 to less than 25. Further, in another embodiment, the polymers have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In yet another embodiment, the polymers, particularly polymers produced in the process of the invention using a Ziegler-Natta-type polymerization catalyst, have a melt index ratio ($I_{21}/I_2$) ($I_{21}$ is measured by ASTM-D-1238-F) in the range of from 15 to 40, preferably in the range of from about 20 to about 35, more preferably in the range of from about 22 to about 30, and most preferably in the range of from 24 to 27.

In yet another embodiment, propylene based polymers are produced in the process of the invention. These polymers include atactic polypropylene, isotactic polypropylene, and syndiotactic polypropylene. Other propylene polymers include propylene random, block or impact copolymers.

In one embodiment, the invention is directed to a gas phase process for polymerizing one or more monomer(s) producing a polymer product in the presence of a catalyst system and a condensable fluid (preferably a C2 to C10 saturated hydrocarbon and/or a fluorinated hydrocarbon) at a temperature below the Critical Temperature, optionally in an insulated reactor, optionally for a period of 12 hours or more, wherein the catalyst system is a bulky ligand metallocene-type catalyst systems as previously defined, and the polymer product having a density (as measured by ASTM D 1238) in the range of from about 0.915 g/cc to about 0.950 g/cc, preferably in the range of from about 0.915 g/cc to 0.945 g/cc, and more preferably in the range of from about 0.915 g/cc to about 0.940 g/cc, and a polymer production rate greater than 40,000 kg/hour, preferably greater than 55,000 kg/hour and most preferably greater than 70,000 kg/hour. In a preferred embodiment, the gas phase process includes a fluidizing medium that is introduced to a reactor, and the process is operating in a condensed mode wherein the level of condensing or condensed liquid is greater than 15 weight percent, preferably greater than 32 weight percent, and most preferably greater than 50 weight percent based on the total weight of fluidizing medium being introduced into the reactor. In yet another embodiment, the partial pressure of the condensable fluid (preferably a C2 to C10 saturated hydrocarbon and/or a fluorinated hydrocarbon) is in the range of from 30 psia (207 kPa) to about 100 psia (690 kPa), preferably in the range from about 35 psia (241 kPa) to 90 psia (621 kPa), and most preferably in the range of from 40 psia (276 kPa) to about 80 psia (552 kPa).

In one embodiment, the invention is directed to a gas phase process for polymerizing one or more hydrocarbon monomer(s) producing a polymer product in the presence of a catalyst system (at a temperature below the Critical Temperature optionally in an insulated reactor and optionally for a period of 12 hours or more) and a condensable fluid (preferably a C2 to C10 saturated hydrocarbon and/or a fluorinated hydrocarbon), wherein the catalyst system is a bulky ligand metallocene-type catalyst systems as previously defined, and the polymer product having a density in the range of from about 0.87 g/cc to less than 0.915 g/cc, preferably in the range of from about 0.88 g/cc to 0.914 g/cc, and more preferably in the range of from about 0.900 g/cc to 0.913 g/cc, and a polymer production rate greater than 35,000 kg/hour, preferably greater than 50,000 kg/hour and most preferably greater than 65,000 kg/hour. In a preferred embodiment, the gas phase process includes a fluidizing medium that is introduced to a reactor, and the process is operating in a condensed mode wherein the level of condensing or condensed is greater than 15 weight percent, preferably greater than 32 weight percent, and most preferably greater than 50 weight percent based on the total weight of fluidizing medium being introduced into the reactor. In yet another embodiment, the partial pressure of the fluorinated hydrocarbon is in the range of from 10 psia (69 kPa) to about 100 psia (690 kPa), preferably in the range from about 15 psia (103 kPa) to 90 psia (621 kPa), and most preferably in the range of from 20 psia (138 kPa) to about 80 psia (552 kPa).

In another embodiment, the invention is directed to a gas phase process for polymerizing one or more hydrocarbon monomer(s) comprising producing a polymer product in the presence of a catalyst system and a condensing agent at temperature below the Critical Temperature optionally in an insulated reactor and optionally for a period of 12 hours or more, wherein the catalysts system is a conventional-type transition metal catalyst system, preferably a Ziegler-Natta-type catalyst system or Phillips type catalyst system, as previously defined, and the polymer product having a density in the range of from about 0.88 g/cc to about 0.940 g/cc, preferably in the range of from about 0.900 g/cc to 0.940 g/cc, and more preferably in the range of from about 0.910 g/cc to about 0.930 g/cc, and a polymer production rate greater than 40,000 kg/hour, preferably greater than 55,000 kg/hour and most preferably greater than 70,000 kg/hour. In a preferred embodiment, the gas phase process includes a fluidizing medium that is introduced to a reactor, and the process is operating in a condensed mode wherein the level of condensing or condensed is greater than 18 weight percent, preferably greater than 34 weight percent, and most preferably greater than 50 weight percent based on the total weight of fluidizing medium being introduced into the reactor. In yet another embodiment, the partial pressure of the condensable fluid is in the range of from 5 psia (35 kPa) to about 100 psia (690 kPa), preferably in the range from about 10 psia (69 kPa) to 90 psia (621 kPa), more preferably in the range of from 15 psia (103 kPa) to about 80 psia (552 kPa), and most preferably in the range of from 20 psia (138 kPa) to about 60 psia (414 kPa).

Polymers produced by the process of the invention are useful in such forming operations as film, sheet, and fiber extrusion and co-extrusion as well as blow molding, injection molding and rotary molding. Films include blown or cast films formed by coextrusion or by lamination, shrink film, cling film, stretch film, sealing films, oriented films. The films are useful in snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages thereof, the following examples are offered.

Density was measured in accordance with ASTM-D-1505-98

Melt Index (MI), I21 and I2 were measured by ASTM D 1238-01. DSC Peak melting point was measured as follows: 3 to 9 milligrams of granular polymer sample was charged into a 30 microliter, aluminum, hermetically sealed capsule (Perkin Elmer part Number B0182901), weighed, and placed on the test stage of a DSC instrument. As is standard practice in the DSC technique, a blank capsule was also placed on the reference stage. (If the test was to be done in the presence of liquid, the test capsule was also charged with the liquid prior to closing, or sealing, the capsule.) The DSC instrument was programmed to start each test by first ramping down the temperature (of both capsules) at a rate of 5° C./min until reaching 0° C., and holding at this temperature for 2 minutes. The temperature was then ramped up at a rate of 5° C./min. until reaching a final temperature of 150° C. During the ramp-up in temperature, the differential heat flow required to heat the polymer containing capsule was recorded. The polymer peak melting temperature was taken as the temperature at which the differential heat flow was at its highest value during the ramp-up.

The isopentane used in the examples was purified by passing it through a bed of oxygen-removal catalyst (BASF R3-11) and then through a stacked bed of 3A molecular sieves and Selexsorb CD.

The 1-hexene comonomer was purified by passing it through 3A molecular sieves and then a bed of Selexsorb CD.

The ethylene was purified by passing it through a column containing oxygen removal catalyst (BASF R3-16), followed by a stacked column containing 3A molecular sieves and Selexsorb CD.

The HFC-245fa was obtained from Honeywell, commercially available under their trade name Enovate 3000. The HFC-245fa was purified by passing it through a stacked column of 3A molecular sieves, oxygen removal catalyst (BASF R3-16), and Selexsorb CD.

Examples 1-3

A series of tests were performed on polymer samples to determine the Critical Temperatures for selected polymer solvent combinations.

In the following examples, the dry sticking temperature was measured by one or both of two methods. The first method involved fluidizing the polymer sample in a medium scale fluidized bed reactor system. (This method is referred to as the medium scale fluidization test). Tests conducted by this method were performed in a fluidized bed reactor equipped with a temperature control system, a differential pressure cell to monitor the polymer bed weight and quality of fluidization, and a GC analyzer for monitoring the gas composition. The reactor consisted of a cylindrical bed section of 15.2 cm diameter and 117 cm height, with a conical expanded section increasing to 25.4 cm diameter at the top of the reactor. Gas entered the fluidized bed through a perforated distributor plate. For each test, the unit was charged with approximately 2500 grams of polymer and fluidized using nitrogen gas at a reactor pressure of 2172 kPa, a fluidization velocity of 0.49 m/sec., and a temperature of 79° C. With the reactor stabilized at these conditions, a test was initiated by slowly increasing the temperature at a steady rate (of 4 to 5° C./hr) until fluidization was lost or the maximum unit operating temperature of 104° C. was reached. (The heating system was limited to a maximum of 104° C.) When the test was completed, the reactor was cooled and the polymer was removed from the reactor. If the polymer was free flowing and polymer material did not aggregate on the reactor walls, it was concluded that the polymer dry sticking temperature had not been reached (i.e. that the dry sticking temperature was greater than 104° C.). If the inspection of the reactor revealed that the polymer had aggregated on the reactor wall, it was concluded that the dry polymer sticking temperature had been reached; in which case the bed differential pressure readings were reviewed to determine the temperature at which quality fluidization was lost as indicated by a reduction in the noise (or bandwidth) in the readings from the differential pressure sensor. In the event that the differential pressure cell did not indicate a loss in quality fluidization during the temperature ramp up, but that the polymer had aggregated to the reactor walls (as determined during the post run inspection), it was concluded that the dry sticking temperature was approximately equal to the maximum temperature achieved in the test (104° C.).

The second method used to determine polymer dry sticking temperature involved a lab scale fluidization apparatus. (This method is referred to as the lab scale fluidization test.) The apparatus consisted of a glass column of 5.1 cm diameter operated under atmospheric pressure and equipped with a glass frit to ensure even distribution of the fluidization gas. The column was surrounded by a an electrical heating jacket with an integral temperature regulator. Approximately 40 to 50 grams of granular polymer was added to the column for each test. The polymer bed was fluidized using heated nitrogen gas. The polymer bed temperature was measured using a thermocouple located approximately 0.5-1.0 cm above the glass frit. The polymer in the column was initially heated to a starting temperature of 85 to 90° C. When the internal temperature stabilized, the flow of nitrogen fluidizing gas was shut off for 30 seconds and then restarted. The polymer bed was then inspected for signs of agglomeration or loss of fluidization (channeling). If no agglomeration or channeling was observed, the temperature was raised by approximately 1-2° C. After the temperature stabilized at the new (higher) value, the nitrogen flow was again interrupted for 30 seconds, and then restarted. The polymer bed was again inspected for signs of agglomeration or channeling. The test continued in this manner until the fluidization gas was observed to channel through the polymer bed or when polymer agglomeration was observed. The dry sticking temperature was taken as the lowest temperature at which channeling or agglomeration first occurred.

Table 1 shows the I2, I21, and molded density values for the three examples along with a brief description of the polymer samples. Table 2 shows the measured peak melting points for each sample. There are four peak melting points shown for each polymer sample, including the dry polymer peak melting point, the isobutane saturated polymer peak melting point, the isopentane saturated polymer peak melting point, and the HFC-245fa saturated polymer peak melting point. Also included in Table 2 is the dry polymer sticking temperature as determined by the medium scale fluidization test (referred to as "Medium Scale" in the table) and as determined by the lab scale fluidization test (referred to as "Lab Scale" in the table). Table 3 shows the calculated melting point depressions for the polymer samples saturated with isobutane, isopentane, and HFC-245fa. Also shown in Table 3 are the calculated critical temperatures for a polymer/isobutane system, a polymer/isopentane system, and a polymer/HFC-245fa system.

Example 1

In this example the critical temperature was determined for a commercial grade linear low density polyethylene sample produced from a conventional-type transition metal catalyst as described in Example A (below) with a hexene comonomer. The polymer 12 was 0.768 dg/min and the molded density was 0.9173 g/cc. The peak DSC melting point for the dry polymer was 125° C. and the melting point depression was measured as 18° C., 21° C., and 2° C. for isobutane, isopentane, and HFC-245fa, respectively. The polymer dry sticking temperature was determined to be 104° C. in both the medium scale fluidization test and lab scale fluidization test. In the medium scale fluidization test there was no indication from the differential bed pressure cell that quality fluidization was lost anytime during the temperature ramp-up; however, visual inspection of the reactor internals following the test showed polymer aggregates caked on the reactor walls approximately 0.5 cm thick. As calculated from the melting point depression and the dry polymer sticking temperature and shown in Table 3, the critical temperature was determined to be 86° C. for a polymer/isobutane system, 83° C. for a polymer/isopentane system, and 102° C. for a polymer/HFC-245fa system.

Example 2

In this example the critical temperature was determined for a bimodal polyethylene resin sample produced from a metallocene-type transition metal catalyst as described in U.S. Pat. Nos. 6,242,545, 6,248,845 and 6,528,597. The polymer 12 was 0.919 dg/min and the molded density was 0.9184 g/cc. The peak DSC melting point for the dry polymer was 125° C. and the melting point depression was measured as 18° C., 23° C., and 3° C. for isobutane, isopentane, and HFC-245fa, respectively. The polymer dry sticking temperature was determined to be 107° C. in the lab scale fluidization test. (In this case the medium scale fluidization test produced an inconclusive result with no indication of sticky resin, reduced DP bandwidth, or reactor fouling indicated at the highest available temperature of 104° C.) Taking the lab scale value of 107° C. as the dry sticking temperature, the critical temperature was determined to be 89° C. for a polymer/isobutane system, 84° C. for a polymer/isopentane system, and 104° C. for a polymer/HFC-245fa system.

Example 3

In this example the critical temperature was determined for a commercial grade polyethylene sample produced from a conventional-type transition metal catalyst as described in Example A with a butene comonomer. The polymer 12 was 1.16 dg/min and the molded density was 0.9188 g/cc. The peak DSC melting point for the dry polymer was 123° C. and the melting point depression was measured as 19° C., 21° C., and 2° C. for isobutane, isopentane, and HFC-245fa, respectively. The polymer dry sticking temperature was determined to be 104° C. in the medium scale fluidization test. In this test there was no indication from the differential bed pressure cell that quality fluidization was lost anytime during the temperature ramp-up; however, visual inspection of the reactor internals following the test showed polymer aggregates caked on the reactor walls approximately 0.5 cm thick. As calculated from the melting point depression and the dry polymer sticking temperature and shown in Table 3, the critical temperature was determined to be 85° C. for a polymer/isobutane system, 83° C. for a polymer/isopentane system, and 102° C. for a polymer/HFC-245fa system.

TABLE 1

| Example No. | Description | I2 (ASTM D1238-01) [dg/min.] | I21 (ASTM D1238-01) [dg/min.] | Density (molded) (ASTM D1505-98) [g/cc] |
|---|---|---|---|---|
| 1 | Z/N Hexene Film (granules) | 0.768 | 31.41 | 0.9173 |
| 2 | Bimodal Metallocene (granules) | 0.919 | 29.72 | 0.9184 |
| 3 | Z/N Butene Film (granules) | 1.160 | 29.05 | 0.9188 |

TABLE 2

| Example No. | Dry Polymer Melting Point DSC peak melt [° C.] | Isobutane Polymer Melting Point DSC peak melt [° C.] | Isopentane Polymer Melting Point DSC peak melt [° C.] | HFC-245fa Polymer Melting Point DSC peak melt [° C.] | Dry Sticking Temp. Medium Scale [° C.] | Dry Sticking Temp. Lab Scale [° C.] |
|---|---|---|---|---|---|---|
| 1 | 125 | 108 | 104 | 123 | 104 | 104 |
| 2 | 125 | 107 | 102 | 122 | >104 | 107 |
| 3 | 123 | 103 | 102 | 121 | 104 | N/A |

TABLE 3

| Example No. | Melting point depression Isobutane [° C.] | Melting point depression Isopentane [° C.] | Melting point depression HFC-245fa [° C.] | Critical Temp. Isobutane [° C.] | Critical Temp. Isopentane [° C.] | Critical Temp. HFC-245fa [° C.] |
|---|---|---|---|---|---|---|
| 1 | 18 | 21 | 2 | 86 | 83 | 102 |
| 2 | 18 | 23 | 3 | 89 | 84 | 104 |
| 3 | 19 | 21 | 2 | 85 | 83 | 102 |

Example A

Preparation of a Conventional-Type Transition Metal Catalyst

A conventional-type transition metal catalyst was prepared from a mixture of a magnesium compound, for example $MgCl_2$, a titanium compound, for example $TiCl_3.1/3AlCl_3$, and an electron donor, for example tetrahydrofuran (THF), and was supported on silica that was dehydrated at 600° C. A detailed description of the preparation procedure can be found in U.S. Pat. No. 4,710,538, which is herein incorporated by reference. The specific catalyst formulation used had a TNHAL/THF mole ratio of 0.27 and a DEAC/THF mole ratio of 0.50 where TNHAL is tri-n-hexyl aluminum and DEAC is diethyl aluminum chloride.

Example B

Preparation of a Metallocene-type Transition Metal Catalyst

A bulky ligand metallocene-type catalyst system was prepared with dimethylsilyl-bis(tetrahydroindenyl)zirconium dichloride ($Me_2Si(H_4Ind)_2ZrCl_2$) available from Albemarle Corporation, Baton Rouge, La. and methylalumoxane, available from Albemarle, Baton Rouge, La. The ($Me_2Si(H_4Ind)_2ZrCl_2$) catalyst compound was combined with a 30 weight percent methylaluminoxane (MAO) in toluene and was supported on Crosfield ES-70 grade silica dehydrated at 600° C. having approximately 1.0 weight percent water Loss on Ignition (LOI). LOI is measured by determining the weight loss of the support material which has been heated and held at a temperature of about 1000° C. for about 22 hours. The Crosfield ES-70 grade silica has an average particle size of 40 microns and is available from Crosfield Limited, Warrington, England.

Examples C, D, E and F

A series of tests were performed in a gas phase reactor to determine the maximum sustainable Induced Condensing Agent (ICA) concentration that could be achieved while maintaining stable fluidization. The tests were carried out with two different ICA materials, isopentane and HFC-245fa. The total reactor pressure was maintained at 2169 kPa and an operating temperature of 85° C. Each test was started with no ICA in the reactor. Once operations stabilized and the unit was operating in steady state conditions, the ICA was introduced into the reactor. The ICA concentration was then ramped up to a target set-point or until the polymer became sticky and it was no longer possible to remove polymer product from the reactor using standard operating procedures.

All of the medium scale tests of Examples C-F were done in a gas phase fluidized bed reactor equipped with devices for temperature control, catalyst feeding or injection equipment, GC analyzer for monitoring and controlling monomer and gas feeds and equipment for polymer sampling and collecting. The reactor consisted of a 6" (15.2 cm) diameter bed section increasing to 10" (25.4 cm) at the reactor top. Gas entered the fluidized bed through a perforated distributor plate. The reactor was also equipped with a product discharge system for removing polymer product from the reactor. A description of the operating conditions for the tests is given in Table A.

Example C

In this example, the reactor was operated with the Ziegler Natta catalyst of Example A with no ICA. The gas phase reactor reached steady state producing a polymer product with a 0.917 g/cc density and a melt index (I2) of 1.21 dg/min. Quality fluidization was maintained throughout the run and no problems were encountered with discharging polymer product from the reactor.

Example D

Similar reactor conditions were employed as in Example C except that isopentane was used to as a conventional ICA. The isopentane concentration was first ramped up to 1.5 mole % and held for 24 hours. Following the 24 hour hold period, the isopentane was further ramped up to between 6 and 7 mole % over a 7 hour period. Above this ICA concentration it was not possible to remove polymer product from the reactor using normal operating procedures. At ICA concentrations lower than 6 to 7 mole %, polymer product could be removed from the reactor using normal operating procedures.

Example E

HFC-245fa was used as the ICA with the Ziegler Natta catalyst of Example A. Other reactor conditions were similar to those in Example C and D. The HFC-245fa concentration was ramped up from 0 mole % to 20.7 mole % over a 48 hour period. The initial ramp up to 4 mole % was carried out over 24 hours and the ramp up from 4 mole % to 20.7 mole % was carried out over the remaining 24 hours. The maximum ICA concentration obtained was measured at 20.7 mole %. This was the highest concentration attempted for this example. At the time an ICA concentration of 20.7 mole % was reached, unrelated technically difficulties forced a shut-down of the unit. At ICA concentrations as high as 20.7 mole %, polymer product could be removed from the reactor using normal operating procedures and no polymer stickiness was observed.

Example F

HFC-245fa was used as the ICA with the metallocene catalyst of Example B. The HFC-245fa concentration was ramped up to 17.8 mole % over a 30 hour period. The HFC-245fa concentration was first ramped up to between 1 mole % and 2 mole % and held for 14 hours. Following the 14 hour hold period, the HFC-245fa concentration was further ramped up to 17.8 mole % over a 16 hour period. This concentration was then held for over 2 hours and was the maximum ICA concentration measured for this example. Throughout this entire test polymer product could be removed from the reactor using normal operating procedures and no polymer stickiness was observed.

TABLE A

| Example | Example C | Example D | Example E | Example F |
|---|---|---|---|---|
| Catalyst | A | A | A | B |
| ICA | None | Isopentane | HFC-245fa | HFC-245fa |
| Reactor Bed Temperature (° C.)* | 85 | 85 | 85 | 79 |
| Reactor Pressure (kPa)* | 2169 | 2169 | 2169 | 2169 |
| Ethylene Partial Pressure (kPa)* | 456 | 453 | 464 | 764 |
| Hexene/Ethylene gas ratio (mole %/mole %)* | 0.116 | 0.071 | 0.101 | 0.034 |
| Hydrogen/Ethylene gas ratio (mole %/mole %)* | 0.191 | 0.196 | 0.193 | 2.9E−04 |
| Triethylaluminum Feed (g/hr)* | 11.8 | 11.9 | 13.5 | 10.0 |
| Production Rate (g/hr)* | 421 | 645 | 380 | 287 |
| Bed Weight (g)* | 1938 | 1933 | 1849 | 1933 |
| Residence Time (hr)* | 4.6 | 3.0 | 4.9 | 6.7 |
| Superficial Gas Velocity (m/s)* | 0.48 | 0.50 | 0.50 | 0.50 |
| Product Density (g/cc) | 0.917 | 0.916 | 0.922 | 0.922 |
| Product Melt Index - I2 (dg/min) | 1.21 | 1.23 | 0.92 | 1.48 |
| Maximum ICA Concentration Achieved under Stable Fluid Bed Operations (mole %) | N/A | 6 to 7 | 20.7 | 17.8 |

*Four hour average.

Discussion of Examples C, D, E and F

Examples C and D illustrate the conventional practice of operating gas phase fluid bed polymerization reactors at reactor temperatures greater than the Critical Temperature. In both Examples C and D the reactor temperature was operated at 85° C., whereas the Critical Temperature was approximately 83° C. This value was taken from the results of Example 1 with isopentane (as shown in Table 3), since the product properties (density and I2) of the resin sample used in Example 1 were similar to those of the resin produced in Examples C and D. Such conventional operation above the critical temperature may lead to resin sticking and/or agglomeration as illustrated by Example D. In that case, relatively high concentrations of isopentane (in combination with the hexene comonomer) induced stickiness in the produce as evidenced by the inability to discharge polymer product from the reactor at isopentane concentrations greater than 6-7 mole % (130-152 kPa).

Examples E and F illustrate the present invention of operation below the Critical Temperature. In Example E, the reactor temperature was 85° C., and the Critical Temperature (with HFC-245fa) was approximately 102° C. In Example F, the reactor temperature was 79° C., and the Critical Temperature was approximately 102° C. (Table 3). These values of Critical Temperature was taken from the results of Examples 1 and 3 with HFC-245fa (shown in Table 3), since the product properties (density and I2) of the resin samples used in Examples 1 and 3 were similar to those produced in Examples E and F. The results from these examples (E and F) show that operation below the Critical Temperature allows much higher concentrations of ICA without inducing stickiness or agglomeration in the resin product. This is best seen in a direct comparison with the same resin grade (the Ziegler-Natta hexene film grade) provided by Examples D and E. In Example D (operation above the Critical Temperature) the limiting ICA concentration was 6-7 mole % (130-152 kPa). In Example E (operation below the Critical Temperature) the limiting ICA concentration was not reached, even with ICA concentrations as high as 20.7 mole % (449 kPa). Such higher concentrations of ICA allow higher dew point temperatures in the reactor and correspondingly higher condensed mode production rates.

While the present invention has been described and illustrated by reference to particular embodiments, those of ordinary skill in the art will appreciate that the invention lends itself to variations not necessarily illustrated herein. For example, it is contemplated that other halogenated fluorocarbons alone or in combination with a fluorinated hydrocarbon as herein described would be useful in the process of the invention. It is also within the scope of this invention that the gas phase process of the invention can be operated in series, with two or more reactors, each reactor operating in a gas phase or one of the reactors operating in a slurry phase. For this reason, then, reference should be made solely to the appended claims for purposes of determining the true scope of the present invention.

All documents described herein are incorporated by reference herein, including any priority documents and/or testing procedures, except to the extent they are inconsistent with this specification.

The invention claimed is:

1. A continuous gas phase process comprising polymerizing one or more hydrocarbon monomer(s) in a fluidized bed reactor in the presence of a metallocene catalyst system or a metallocene-type catalyst system and a condensable fluid for a period of at least 12 hours where the bed temperature is less than the Critical Temperature and the dew point temperature of the gas composition in the reactor is within 25° C. of the bed temperature.

2. The process of claim 1 wherein the process is operated in condensed mode.

3. The process of claim 1 wherein the reactor is insulated.

4. The process of claim 2 wherein the reactor is insulated.

5. The process of claim 1 wherein the condensable fluid comprises a C3 to C10 hydrocarbon, a fluorinated hydrocarbon or a combination thereof.

6. The process of claim 1 where the dew point temperature of the gas composition in the reactor is within 20° C. of the bed temperature.

7. The process of claim 6 where the dew point temperature of the gas composition in the reactor is within 15° C. of the bed temperature.

8. The process of claim 6 where the dew point temperature of the gas composition in the reactor is within 10° C. of the bed temperature.

9. The process of claim 6 where the dew point temperature of the gas composition in the reactor is within 5° C. of the bed temperature.

10. The process of claim 1 wherein the process comprises the steps of:
(a) introducing a recycle stream into the reactor, the recycle stream comprising one or more monomer(s);
(b) introducing a polymerization catalyst and a condensable fluid into the reactor where the bed temperature is less than the Critical Temperature and the dew point temperature of the gas composition in the reactor is within 25° C. of the bed temperature;
(c) withdrawing the recycle stream from the reactor;
(d) cooling the recycle stream to form a gas phase and a liquid phase;
(e) reintroducing the gas phase and the liquid phase, separately, and/or in combination, into the reactor;
(f) introducing into the reactor additional monomer(s) to replace the monomer(s) polymerized; and
(g) withdrawing a polymer from the reactor.

11. The process of claim 10, wherein the process is operated in the condensed mode.

12. The process of claim 10, wherein polymer is withdrawn in step (g) at a rate of at least 50,000 lb/hour.

13. The process of claim 1 wherein the gas phase polymerization is operated in a condensed mode in which a liquid and a gas are introduced to a fluidized bed reactor having a fluidizing medium, wherein the level of condensable fluid is greater than 1 weight percent based on the total weight of the liquid and gas entering the reactor.

14. The process of claim 13 wherein the level of condensable fluid is greater than 2 weight percent.

15. The process of claim 13 wherein the level of condensable fluid is greater than 10 weight percent.

16. The process of claim 13 wherein the level of condensable fluid is greater than 25 weight percent.

17. The process of claim 13 wherein the level of condensable fluid is greater than 30 weight percent.

18. The process of claim 1 where the condensable fluid comprises a C2 to C10 saturated or unsaturated hydrocarbon.

19. The process of claim 1 wherein the condensable fluid comprises one or more of propane, n-butane, isobutane, n-pentane, isopentane, neopentane, n-hexane, isohexane, n-heptane, or n-octane.

20. The process of claim 10 wherein the condensable fluid comprises a C2 to C10 saturated or unsaturated hydrocarbon.

21. The process of claim 10 wherein the condensable fluid comprises one or more of propane, n-butane, isobutane, n-pentane, isopentane, neopentane, n-hexane, isohexane, n-heptane, or n-octane.

22. The process of claim 13 wherein the condensable fluid comprises a C2 to C10 saturated or unsaturated hydrocarbon.

23. The process of claim 13 wherein the condensable fluid comprises one or more of propane, n-butane, isobutane, n-pentane, isopentane, neopentane, n-hexane, isohexane, n-heptane, or n-octane.

24. The process of claim 1 wherein the condensable fluid comprises a fluorinated hydrocarbon which consists essentially of at least one carbon atom and at least one fluorine atom, and optionally at least one hydrogen atom.

25. The process of claim 1 wherein the condensable fluid comprises a fluorinated hydrocarbon represented by the formula:

wherein x is an integer from 1 to 40, and y is an integer greater than or equal to 0 and z is an integer of at least 1.

26. The process of claim 25 wherein y and z are integers equal to or greater than 1.

27. The process of claim 25 wherein x is an integer in the range of from 1 to 10 and z is 2 or more.

28. The process of claim 1 wherein the condensable fluid is one or more of: 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, or 2,3-dihydro-decafluoropentane.

29. The process of claim 10 wherein the condensable fluid is one or more of propane, n-butane, isobutane, n-pentane, isopentane, neopentane, n-hexane, isohexane, and other saturated $C_6$ hydrocarbons, n-heptane, or n-octane.

30. The process of claim 1 wherein the one or more monomer(s) are selected from one or more of the group consisting of ethylene, propylene, butene-1,4-methyl-pentene-1, hexene-1, and octene-1.

31. The process of claim 1 wherein the gas phase process has operating conditions comprising a pressure in the range of from 1379 kPa to 2759 kPa, a polymerization temperature in the range of from 70° C. to 110° C., and a partial pressure of condensable fluid in the range of from 35 kPa to 690 kPa.

32. The process of claim 10 where the process occurs in a fluidized bed reactor, the process is operating in a condensed mode in which a liquid and a gas are introduced to the fluidized bed reactor having a fluidizing medium, wherein the level of a condensable fluid is greater than 1 weight percent based on the total weight of the liquid and gas entering the fluidized bed reactor.

33. The process of claim 10 wherein the condensable fluid, is a fluorinated hydrocarbon and the level of the fluorinated hydrocarbon is greater than 10 weight percent of the total weight of the liquid and gas entering the fluidized bed reactor.

34. The process of claim 25 wherein the level of the fluorinated hydrocarbon is from 15 weight percent to 60 weight percent of the total weight of the liquid and gas entering the fluidized bed reactor.

35. The process of claim 1 wherein the gas phase process has operating conditions comprising a partial pressure of fluorinated hydrocarbon in the range of from 35 kPa to 690 kPa.

36. The process of claim 1 wherein the reactor temperature is within 10° C. below the Critical Temperature.

37. The process of claim 10 wherein the reactor temperature is within 5° C. below the Critical Temperature.

38. A continuous gas phase process comprising polymerizing one or more hydrocarbon monomer(s) in a fluidized bed reactor in the presence of a metallocene catalyst system or a metallocene-type catalyst system and a condensable fluid for a period of at least 12 hours where the bed temperature is less than the Z Temperature and the dew point temperature of the gas composition in the reactor is within 25° C. of the bed temperature, where the Z Temperature is equal to the heat seal initiation temperature minus the melting point depression of the polymer to be made.

39. The process of claim 38 wherein the process is operated in condensed mode.

40. The process of claim 38 wherein the reactor is insulated.

41. The process of claim 38 wherein the condensable fluid comprises a C3 to C10 hydrocarbon, a fluorinated hydrocarbon or a combination thereof.

42. The process of claim 38 where the dew point temperature of the gas composition in the reactor is within 20° C. of the bed temperature.

43. The process of claim 38 wherein the one or more monomer(s) are selected from one or more of the group consisting of ethylene, propylene, butene-1,4-methyl-pentene-1, hexene-1, and octene-1.

44. The process of claim 38 wherein the process comprises the steps of:
(a) introducing a recycle stream into the reactor, the recycle stream comprising one or more monomer(s);
(b) introducing a polymerization catalyst and a condensable fluid into the reactor where the bed temperature is less than the Z Temperature and the dew point temperature of the gas composition in the reactor is within 25° C. of the bed temperature;
(c) withdrawing the recycle stream from the reactor;
(d) cooling the recycle stream to form a gas phase and a liquid phase;
(e) reintroducing the gas phase and the liquid phase, separately, and/or in combination, into the reactor;
(f) introducing into the reactor additional monomer(s) to replace the monomer(s) polymerized; and
(g) withdrawing a polymer from the reactor.

45. The process of claim 44, wherein the process is operated in the condensed mode.

46. The process of claim 44, wherein polymer is withdrawn in step (g) at a rate of at least 50,000 lb/hour.

47. The process of claim 38 wherein the gas phase polymerization is operated in a condensed made in which a liquid and a gas are introduced to a fluidized bed reactor having a fluidizing medium, wherein the level of condensable fluid is greater than 1 weight percent based on the total weight of the liquid and gas entering the reactor.

48. The process of claim 38 wherein the level of condensable fluid is greater than 2 weight percent.

49. The process of claim 38 wherein the level of condensable fluid is greater than 10 weight percent.

50. The process of claim 38 where the condensable fluid comprises a C2 to C10 saturated or unsaturated hydrocarbon.

51. The process of claim 38 wherein the condensable fluid comprises one or more of propane, n-butane, isobutane, n-pentane, isopentane, neopentane, n-hexane, isohexane, n-heptane, or n-octane.

52. The process of claim 38 wherein the condensable fluid comprises a fluorinated hydrocarbon which consists essentially of at least one carbon atom and at least one fluorine atom, and optionally at least one hydrogen atom.

53. The process of claim 52 wherein the condensable fluid comprises a fluorinated hydrocarbon represented by the formula:

$$C_xH_yF_z$$

wherein x is an integer from 1 to 40, and y is an integer greater than or equal to 0 and z is an integer of at least 1.

54. The process of claim 38 wherein the condensable fluid is one or more of: 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, or 2,3-dihydrodecafluoropentane.

55. The process of claim 38 wherein the gas phase process has operating conditions comprising a pressure in the range of from 1379 kPa to 2759 kPa, a polymerization temperature in the range of from 70° C. to 110° C., and a partial pressure of condensable fluid in the range of from 35 kPa to 690 kPa.

56. The process of claim 38 wherein the reactor temperature is within 10° C. below the Z Temperature.

57. A continuous gas phase process comprising polymerizing one or more hydrocarbon monomer(s) in a fluidized bed reactor in the presence of a metallocene catalyst system or a metallocene-type catalyst system and a condensable fluid for a period of at least 12 hours where the bed temperature is less than the Q Temperature and the dew point temperature of the gas composition in the reactor is within 25° C. of the bed temperature, where the Q Temperature is equal to the hot tack initiation temperature minus the melting point depression of the polymer to be made.

* * * * *